(12) United States Patent
Goto

(10) Patent No.: US 11,292,429 B2
(45) Date of Patent: Apr. 5, 2022

(54) IN-VEHICLE COMMUNICATION SYSTEM

(71) Applicant: YAZAKI CORPORATION, Tokyo (JP)

(72) Inventor: Jun Goto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 82 days.

(21) Appl. No.: 16/908,664

(22) Filed: Jun. 22, 2020

(65) Prior Publication Data

US 2021/0024033 A1 Jan. 28, 2021

(30) Foreign Application Priority Data

Jul. 23, 2019 (JP) .............................. JP2019-135285
Oct. 16, 2019 (JP) .............................. JP2019-189681

(51) Int. Cl.
*B60R 16/02* (2006.01)
*B60R 22/48* (2006.01)
*B60R 16/023* (2006.01)
*H04L 12/28* (2006.01)

(52) U.S. Cl.
CPC ............ *B60R 22/48* (2013.01); *B60R 16/023* (2013.01); *B60R 2022/4808* (2013.01)

(58) Field of Classification Search
CPC ..... B60R 16/023; B60R 16/02; B60R 21/015; B60R 22/48; H04L 12/28
See application file for complete search history.

(56) References Cited

U.S. PATENT DOCUMENTS

| 2008/0238647 | A1  | 10/2008 | Abe |
| 2009/0289443 | A1* | 11/2009 | Okezie .............. B60R 21/01546 280/735 |
| 2010/0283593 | A1* | 11/2010 | Miller ...................... G08B 5/36 340/447 |
| 2018/0170306 | A1* | 6/2018  | Seaman, IV ........ B60C 23/0418 |
| 2018/0271226 | A1* | 9/2018  | Sikorski ............. A44B 11/2565 |
| 2018/0345903 | A1* | 12/2018 | Ishibashi ................. B60R 22/48 |
| 2019/0039546 | A1* | 2/2019  | Elangovan ........... G07C 9/0069 |
| 2019/0176736 | A1* | 6/2019  | Jang ........................ B60R 22/48 |

FOREIGN PATENT DOCUMENTS

| EP | 3 208 157 A1 | 8/2017 |
| JP | 2008-238947 A | 10/2008 |
| JP | 2011-88580 A | 5/2011 |
| JP | 2019-48579 A | 3/2019 |

* cited by examiner

*Primary Examiner* — Tan Q Nguyen
(74) *Attorney, Agent, or Firm* — Kenealy Vaidya LLP

(57) ABSTRACT

An in-vehicle communication system includes a master control unit mounted on a vehicle, a plurality of slave devices mounted on the vehicle, a plurality of buckles provided in association with each of a plurality of seats mounted on the vehicle, and at least one switch unit configured to generate a signal in accordance with an attachment and detachment state of at least one of the plurality of buckles. The master control unit is communicably connected to each of the slave devices. The master control unit controls the plurality of slave devices based on the signal generated by the at least one switch unit.

9 Claims, 35 Drawing Sheets

FIG. 2
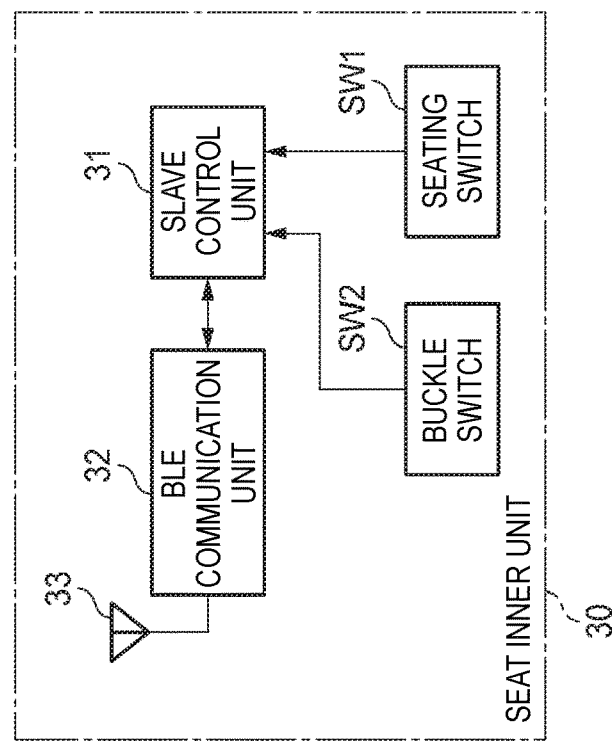
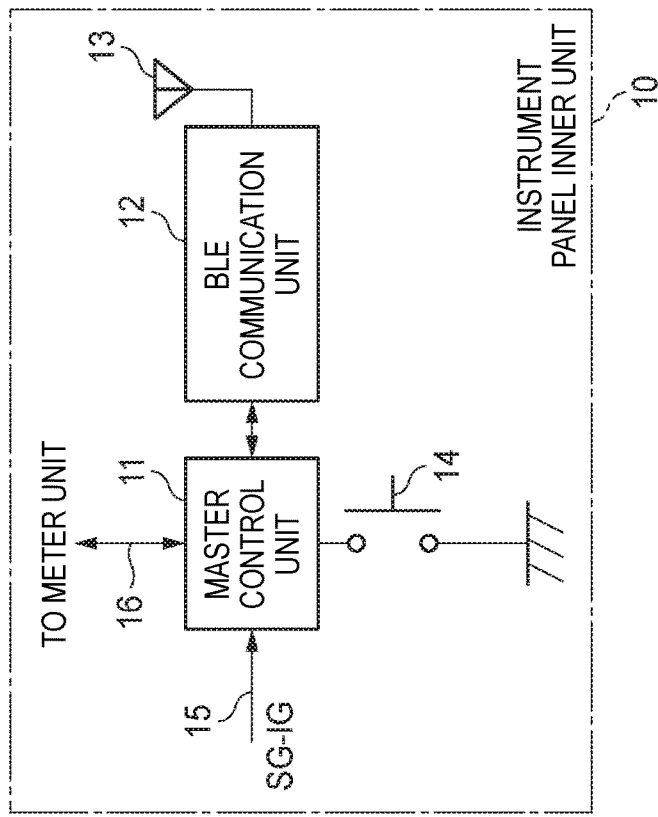

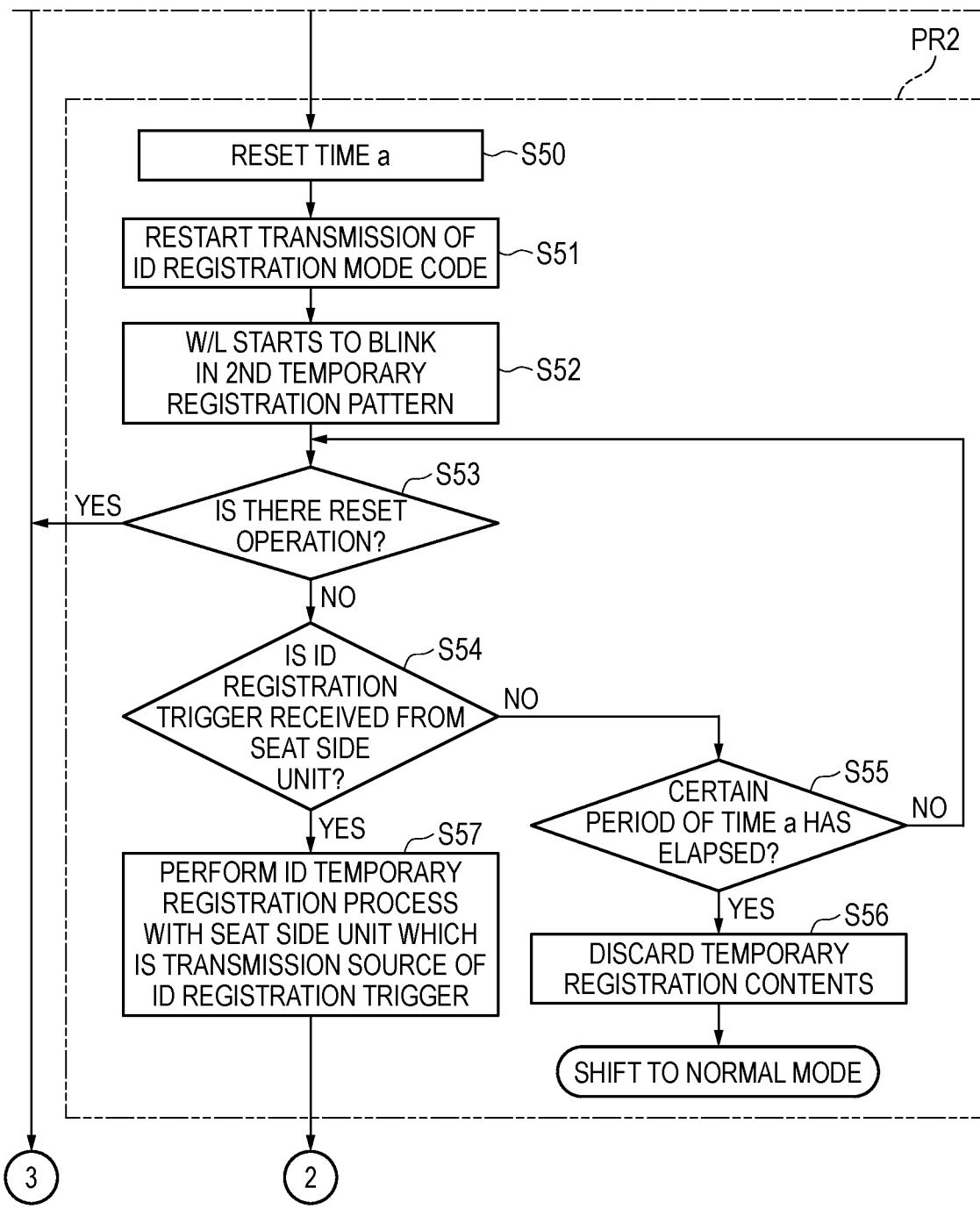

FIG. 6

| SEAT BELT TAKE-OFF AND WEARING PATTERN | OPERATION CONDITION | INSTRUCTION CONTENTS |
|---|---|---|
| PT0 | 5 TIMES OF TAKE-OFF AND WEARING IN 10 SECONDS | SEAT SIDE REGISTRATION INSTRUCTION (NO SEAT POSITION DESIGNATION) |
| PT1 | 3 TIMES OF TAKE-OFF AND WEARING IN 10 SECONDS | SEAT SIDE REGISTRATION INSTRUCTION (POSITION IS LEFT SIDE OF REAR SEAT) |
| PT2 | 6 TIMES OF TAKE-OFF AND WEARING IN 10 SECONDS | SEAT SIDE REGISTRATION INSTRUCTION (POSITION IS CENTER OF REAR SEAT) |
| PT3 | 9 TIMES OF TAKE-OFF AND WEARING IN 10 SECONDS | SEAT SIDE REGISTRATION INSTRUCTION (POSITION IS RIGHT SIDE OF REAR SEAT) |

FIG. 28

| COMMAND (DETACHMENT AND ATTACHMENT PATTERN) | TIMING CHART | MODE TO SHIFT |
|---|---|---|
| LONG, SHORT, SHORT, SHORT, SHORT, SHORT | ON (BUCKLE DETACHMENT) OFF (BUCKLE ATTACHMENT) — LONG SHORT SHORT | AIR CONDITIONER OPERATION MODE |
| LONG, LONG | ON (BUCKLE DETACHMENT) OFF (BUCKLE ATTACHMENT) — LONG LONG | AUDIO OPERATION MODE |

FIG. 29

| COMMAND (DETACHMENT AND ATTACHMENT PATTERN) | TIMING CHART | AIR CONDITIONER OPERATION MODE | AUDIO OPERATION MODE |
|---|---|---|---|
| LONG, SHORT →NO OPERATION WITHIN CERTAIN PERIOD OF TIME D | ON (BUCKLE DETACHMENT) OFF (BUCKLE ATTACHMENT) — LONG SHORT SHORT — D | SET TEMPERATURE UP | VOLUME UP |
| LONG, LONG →NO OPERATION WITHIN CERTAIN PERIOD OF TIME D | ON (BUCKLE DETACHMENT) OFF (BUCKLE ATTACHMENT) — LONG LONG — D | SET TEMPERATURE DOWN | VOLUME DOWN |
| SHORT, SHORT, SHORT, SHORT, SHORT →NO OPERATION WITHIN CERTAIN PERIOD OF TIME D | ON (BUCKLE DETACHMENT) OFF (BUCKLE ATTACHMENT) — SHORT SHORT — D | AIR VOLUME UP | SWITCH AUDIO SOURCE |
| SHORT, SHORT →NO OPERATION WITHIN CERTAIN PERIOD OF TIME D | ON (BUCKLE DETACHMENT) OFF (BUCKLE ATTACHMENT) — SHORT — D | AIR VOLUME DOWN | MUTE/CANCEL MUTE |
| SHORT, LONG →NO OPERATION WITHIN CERTAIN PERIOD OF TIME D | ON (BUCKLE DETACHMENT) OFF (BUCKLE ATTACHMENT) — SHORT LONG — D | AIR CONDITIONER ON/OFF | PLAY/TEMPORARY STOP | under 35
IN-VEHICLE COMMUNICATION SYSTEM

CROSS-REFERENCE TO RELATED APPLICATIONS

This application is based on and claims priority under 35 USC 119 from Japanese Patent Application No. 2019-135285 filed on Jul. 23, 2019 and Japanese Patent Application No. 2019-189681 filed on Oct. 16, 2019, the contents of which are incorporated herein by reference.

TECHNICAL FIELD

The present invention relates to an in-vehicle communication system that can be used to control a desired in-vehicle device through using wireless communication on a vehicle.

BACKGROUND ART

In order to monitor and control various in-vehicle devices, it is necessary to connect and communicate between a host electronic control unit (ECU) and in-vehicle devices provided at various locations. However, for example, when an in-vehicle device provided in a movable portion or in the vicinity of the movable portion is connected to the host ECU by using a wire harness, it is necessary to solve various difficulties. Moreover, it is also desirable to reduce the number of electric wires constituting the wire harness. Therefore, it may be necessary to connect each in-vehicle device and the host ECU by wireless communication on a vehicle.

For example, a "vehicle provided with a seat belt" of JP-A-2008-238947 describes a technique for quickly detecting a wearing state of a seat belt on a vehicle side by wireless communication. Moreover, in JP-A-2008-238947, a signal including a preamble signal is repeatedly transmitted for a predetermined number of times from a second transmitter 30. Moreover, information for identifying a signal is from which seat 2, information detected by a sensor 34 indicating whether a seat belt 3 is pulled out or rewound, and a data signal including ID information set uniquely in a vehicle 1 are transmitted each time following the preamble signal.

For example, in a case of communicating between a host ECU and a plurality of desired in-vehicle devices, it is necessary to use unique ID information or the like to distinguish each communication partner. However, in a case where devices having the same function are managed with a common product number, ID information unique to all devices cannot be registered in advance. Moreover, in a case where wireless communication is used, it is necessary to distinguish not only devices mounted on a host vehicle but also devices on other vehicles existing within a range where wireless communication is enabled.

Therefore, after each device is actually installed on a vehicle, it is assumed that, for example, a dealer manager allocates unique ID information to each device for each vehicle before a user uses the vehicle. However, when a target device to which the unique ID information is allocated is a device configured to detect the wearing state of the seat belt as in JP-A-2008-238947, it is very difficult to assemble or remove a seat belt device to the vehicle. Therefore, for example, it is conceivable to disassemble the device before the seat belt device is assembled to the vehicle, take out electronic components thereof (circuit board and the like) to facilitate the operation, and allocate unique ID information to each vehicle and to each device through using a dedicated tool.

Therefore, the allocation of the ID information cannot be performed unless the dedicated tool is available. Moreover, the allocation of the ID information becomes difficult after the seat belt device was assembled to the vehicle. Moreover, even when the user replaces the device, the ID information cannot be allocated to a new device unless the vehicle is brought to a dealer after the replacement and the dedicated tool is used.

When a special function is added to allocate the ID information or the like, it is usually necessary to add a large number of electronic components, such as switches, and to prepare special interfaces, which may result in an increase in cost. In particular, since the same number of independent seat belt devices as the number of occupants seated in seats on the vehicle is prepared, the ID information also needs to be allocated by the same number as the number of occupants, and thus allocation of the ID information is not easy.

SUMMARY OF INVENTION

The present invention has been made in view of the above circumstances, and an object thereof is to provide an in-vehicle communication system capable of easily performing preparation operations, such as allocation of ID information which is necessary for using a device, even in a situation where it is difficult to assemble and remove the device to be processed to and from a vehicle, such as when the device is a seat belt device.

In order to achieve the above object, the in-vehicle communication system according to the present invention is characterized by the following (1) to (9).

(1) There is provided an in-vehicle communication system including:
a master control unit mounted on a vehicle;
a plurality of slave devices mounted on the vehicle, the master control unit being communicably connected to each of the slave devices:
a plurality of buckles provided in association with each of a plurality of seats mounted on the vehicle; and
at least one switch unit configured to generate a signal in accordance with an attachment and detachment state of at least one of the plurality of buckles,
in which the master control unit controls the plurality of slave devices based on the signal generated by the at least one switch unit.

(2) For example, the at least one switch unit is a plurality of switch units which are configured to generate a signal according to an attachment and detachment state of each of the plurality of buckles, and each one of the plurality of switch units is allocated to each one of the plurality of slave devices respectively.

(3) For example, the master control unit allocates a unique identification information to each of the plurality of slave devices in response to generation of the signal generated by the at least one switch unit.

(4) For example, the master control unit repeatedly performs an operation for allocating the unique identification information to each of the plurality of slave devices for a predetermined number of times in a predetermined order in response to the generation of the signal generated by the at least one switch unit.

(5) For example, the master control unit recognizes a generation pattern of the signal when allocating the unique identification information to at least one of the plurality of slave devices in response to the generation of the signal generated by the at least one switch unit, and specifies the slave device to be allocated with the unique identification information.

(6) For example, the plurality of slave devices are configured to control an operation of an electronic device, and the operation of the electronic device is controlled based on the signal generated by the at least one switch unit.

(7) For example, the electronic device is provided in association with each of the plurality of seats, and is a drive device configured to move the corresponding seat, and the plurality of slave devices are provided in association with the plurality of seats respectively, and each of the plurality of slave devices is configured to control the corresponding drive device based on the signal generated by the at least one switch unit.

(8) For example, the master control unit switches between a seat position registration mode and a seat position read mode based on the signal generated by the at least one switch unit, registers a current seat position in association with the signal generated by the at least one switch unit after switching to the seat position registration mode, reads the seat position registered in association with the signal generated by the at least one switch unit after switching to the seat position read mode, and controls the drive device to move to the read seat position.

(9) For example, the master control unit selects any one of the plurality of slave devices based on the signal generated by the at least one switch unit, and transmits an operation request signal corresponding to the signal generated by the at least one switch unit to the selected slave device after selecting any one of the plurality of slave devices.

According to the in-vehicle communication system having the above configuration (1), for example, when an user operates a seat belt to change an attachment and detachment state of a buckle provided in the vicinity of a seat, the switch unit detects the attachment and detachment state of the buckle and generates a signal. The master control unit controls the plurality of slave devices based on the signal generated by the switch unit. That is, a trigger for controlling each slave device can be generated by the operation of the seat belt. Therefore, for example, if such an operation is applied when unique ID information is allocated to each slave device, the ID information can be allocated without connecting a special tool. Moreover, no special operation is required, such as removing a seat belt device from a vehicle, disassembling the device and removing electronic components thereof.

According to the in-vehicle communication system having the above configuration (2), the plurality of switch units can individually detect attachment and detachment states of seat belts at respective positions of a plurality of seats. The attachment and detachment state of the seat belt at each position can be grasped by using each of the plurality of slave devices. Therefore, for example, it is possible to confirm, for all occupants, whether any occupant has forgotten to wear the seat belt when the vehicle is traveling, and to output an alarm if necessary.

According to the in-vehicle communication system having the above configuration (3), the unique identification information can be allocated to each of the plurality of slave devices when the user or the like operates the seat belt. Therefore, even when identification information is not allocated to each slave device in advance, it becomes easy for the master control unit to allocate unique identification information to each slave device to distinguish the device from other devices.

According to the in-vehicle communication system having the above configuration (4), even when the number of seats is large and the number of slave devices is large, the unique identification information can be allocated to all slave devices simply by repeating the same operation. That is, an operation of selecting a slave device to be operated at a specific seat position from the plurality of slave devices is not necessary, and an operator such as a user can allocate appropriate identification information to each slave device simply by repeating a monotonous operation.

According to the in-vehicle communication system having the above configuration (5), the master control unit can specify the slave device, which is the allocation destination, based on the generation pattern of the signal. Therefore, for example, when an operator such as a user performs an operation of the seat belt, the allocation destination can be changed simply by switching an operation pattern of the attachment and detachment state. For example, in a case where only one seat belt device is replaced, only a slave device located at a corresponding location can be designated as the allocation destination, so there is no need to perform the allocation of the identification information again for all slave devices, and thus operation time can be reduced.

According to the in-vehicle communication system having the above configuration (6), the slave device can control the operation of the electronic device based on the generation pattern of the signal. Therefore, there is no need to provide a dedicated operation unit for the electronic device separately from the buckle, and cost reduction can thus be achieved.

According to the in-vehicle communication system having the above configuration (7), the slave device can control the operation of the drive device of the seat based on the generation pattern of the signal. Therefore, the number of operation units for the drive device of the seat is not increased, and cost reduction can thus be achieved.

According to the in-vehicle communication system having the above configuration (8), the slave device can register and read the seat position based on the generation pattern of the signal. Therefore, it is not necessary to provide an operation unit for each registered seat position, and cost reduction can thus be achieved.

According to the in-vehicle communication system having the above configuration (9), the slave device can be selected based on the generation pattern of the signal, and the operation request signal can be transmitted to the selected slave device. Therefore, it is not necessary to provide an operation unit for each slave device, and cost reduction can thus be achieved.

According to the in-vehicle communication system of the present invention, the preparation operations, such as the allocation of the ID information which is necessary for using the device can be easily performed even in the situation where it is difficult to assemble and remove the device to be processed to and from the vehicle, such as when the device is the seat belt device. That is, since control is performed by using an operation of changing an attachment and detachment state of the seat belt, it is not necessary to prepare a special tool, and an operation for connecting the tool is also unnecessary.

The present invention has been briefly described above. Details of the present invention will be further clarified by reading a mode (hereinafter, referred to as "embodiment") for carrying out the present invention described below with reference to the accompanying drawings.

BRIEF DESCRIPTION OF DRAWINGS

FIG. 2 is a block diagram showing configuration examples of an instrument panel inner unit and a seat inner unit.

FIG. 6 is a schematic view showing a list of seat belt take-off and wearing patterns, operation conditions, and instruction contents.

FIG. 28 is a table showing a buckle attachment and detachment pattern, a buckle switch on and off time chart, and a mode transition destination of the third embodiment.

FIG. 29 is a table showing the buckle attachment and detachment pattern, the buckle switch on and off time chart, and operation contents of an air conditioner operation mode and an audio operation mode of the third embodiment.

DESCRIPTION OF EMBODIMENTS

First Embodiment

A first embodiment of the present invention will be described below with reference to the drawings.

Configuration of In-Vehicle Communication System

Figure 1:
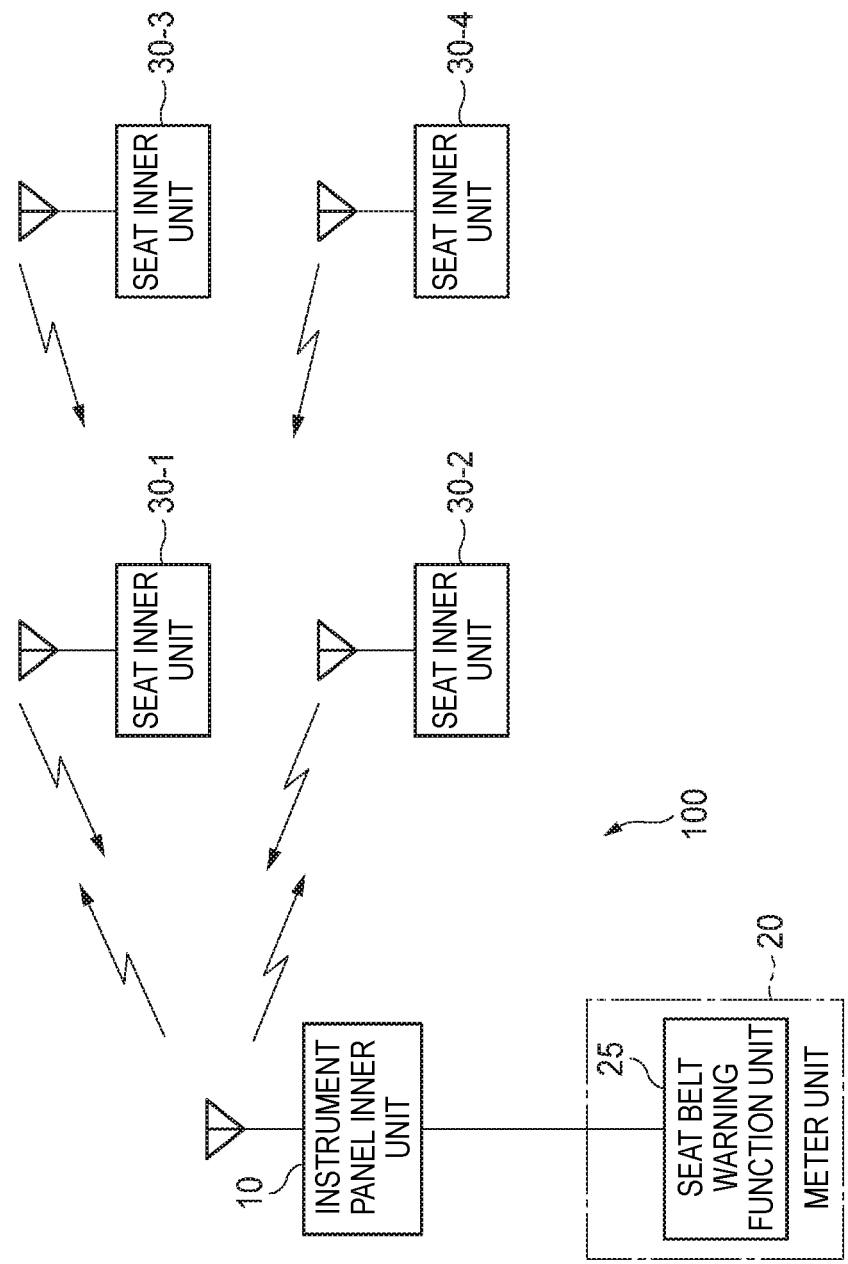
FIG. 1 is a block diagram showing a configuration example of an in-vehicle communication system.

FIG. 1 is a block diagram showing a configuration example of an in-vehicle communication system 100.

The in-vehicle communication system 100 includes one instrument panel inner unit 10 and a plurality of seat inner units 30-1 to 30-4. The instrument panel inner unit 10 is connected to a meter unit 20.

Each of the plurality of seat inner units 30-1 to 30-4 is arranged in the vicinity of a position where each occupant is seated on the same vehicle, and is provided in a seat. Therefore, the seat inner units 30-1 to 30-4 can be used, for example, for grasping situations such as whether the occupant at each position is seated and whether the occupant at each position is wearing a seat belt.

Since seats, in which the seat inner units 30-1 to 30-4 are arranged respectively, are movable structures, various problems are expected to occur when a device outside the seat is physically connected to the seat inner units 30-1 to 30-4 through using wire harnesses. Therefore, each of the seat inner units 30-1 to 30-4 has a wireless communication function and can communicate without using the wire harnesses.

The instrument panel inner unit 10 and the meter unit 20 are provided inside an instrument panel of the vehicle. The instrument panel inner unit 10 has a wireless communication function for communicating with the seat inner units 30-1 to 30-4, and is enabled to manage the seat inner units 30-1 to 30-4. The function of the instrument panel inner unit 10 may also be built into and integrated with the meter unit 20.

Since the instrument panel inner unit 10 can acquire information of the seat inner units 30-1 to 30-4, it is possible to grasp presence or absence of seating of the occupant and to grasp whether a seat belt is being worn at each seating position of the occupant.

By using the information grasped by the instrument panel inner unit 10, a seat belt warning function unit 25 in the meter unit 20 can, by lamp display or the like, warn the occupant that wearing of the seat belt has been forgotten at the seating position of each seat when the wearing of the seat belt is necessary. Such a display function can also be used for other purposes.

Configuration of Instrument Panel Inner Unit and Seat Inner Unit

Specific configuration examples of the instrument panel inner unit 10 and one seat inner unit 30 in FIG. 1 are shown in FIG. 2.

The seat inner unit 30 includes a slave control unit 31, a Bluetooth low energy (BLE) communication unit 32, an antenna 33, a seating switch SW1, and a buckle switch SW2. Each seat inner unit 30 is equipped with a small battery (not shown) serving as an internal power supply.

The BLE communication unit 32 is a wireless communication module for short-range communication conforming to the Bluetooth (registered trademark) standard, and particularly has a low power consumption communication mode corresponding to BLE. Therefore, the seat inner unit 30 is not necessarily connected to a vehicle side power supply, and can be used for a long period of time only with the internal power supply.

The slave control unit 31 includes a microcomputer configured to control the seat inner unit 30. The microcomputer in the slave control unit 31 can operate in accordance with a program incorporated in advance and communicate with the instrument panel inner unit 10 to realize a predetermined function.

In order to enable communication between the instrument panel inner unit 10 and a plurality of the seat inner units 30 on a host vehicle, it is necessary to allocate unique ID information for each vehicle and each seat inner unit 30 so as to make it possible to specify the respective seat inner units 30. In order to standardize components, the unique ID information is not registered in advance in each of the seat inner units 30. Therefore, communication is performed between the instrument panel inner unit 10 and each of the seat inner units 30 to determine and register the unique ID information. A function for realizing such an operation is also provided in the slave control unit 31.

The seating switch SW1 detects whether there is pressing related to seating at a predetermined position in the seat of each occupant or not, and then generates an electric signal for turning on and off. Such an electric signal is input to the slave control unit 31.

The buckle switch SW2 is provided in a buckle which is necessary for receiving and fixing a tongue (projection portion) of the seat belt. The buckle switch SW2 is configured as a switch that turns on when the tongue is inserted into the buckle of the seat belt by an operation of the occupant or the like, and turns off when the tongue is pulled out. An electric signal indicating on and off of the buckle switch SW2 is input to the slave control unit 31.

In the present embodiment, the buckle switch SW2 can be used as an operation unit when a user or the like performs a special operation as will be described below. Specifically, an operation instruction for registering ID information can be generated through using a repetitive pattern of take-off and wearing of the seat belt.

The instrument panel inner unit 10 shown in FIG. 2 includes a master control unit 11, a BLE communication unit 12, an antenna 13, a reset switch 14, a signal line 15, and a communication line 16.

The BLE communication unit 12 is a wireless communication module for short-range communication conforming to the Bluetooth standard, and particularly has a low power consumption communication mode corresponding to BLE. The BLE communication unit 12 of the instrument panel inner unit 10 is used to wirelessly communicate with each of the plurality of seat inner units 30 mounted on the host vehicle.

The master control unit 11 includes a microcomputer configured to control the in-vehicle communication system 100 and the instrument panel inner unit 10. The microcomputer of the instrument panel inner unit 10 can operate in accordance with a program incorporated in advance, communicate with each of the seat inner units 30 and communicate with the meter unit 20.

As described above, in order to enable the communication between the instrument panel inner unit 10 and the plurality of the seat inner units 30 on the host vehicle, it is necessary to allocate the unique ID information for each vehicle and each seat inner unit 30 so as to make it possible to specify the respective seat inner units 30. Therefore, the master control unit 11 also has a function of performing communication between the instrument panel inner unit 10 and each of the seat inner units 30 to determine the unique ID information and register the same in each of the seat inner units 30.

The reset switch 14 is configured to be operated by a user or the like at the time of vehicle maintenance or the like to generate a special instruction. Although it is assumed that the reset switch 14 is always prepared as a hardware component in the example of FIG. 2, the reset switch 14 may also be prepared as a software switch that can be used only when necessary. For example, it is assumed that a software switch having the same function as that of the reset switch 14 is allocated on a display screen of the meter unit 20 as necessary.

The signal line 15 is used to input an ignition signal SG-IG, which changes in accordance with on and off of an ignition of the vehicle, to the master control unit 11. The communication line 16 is used for communication between the instrument panel inner unit 10 and the meter unit 20.

Arrangement of Components of Seat Inner Unit

Figure 3:
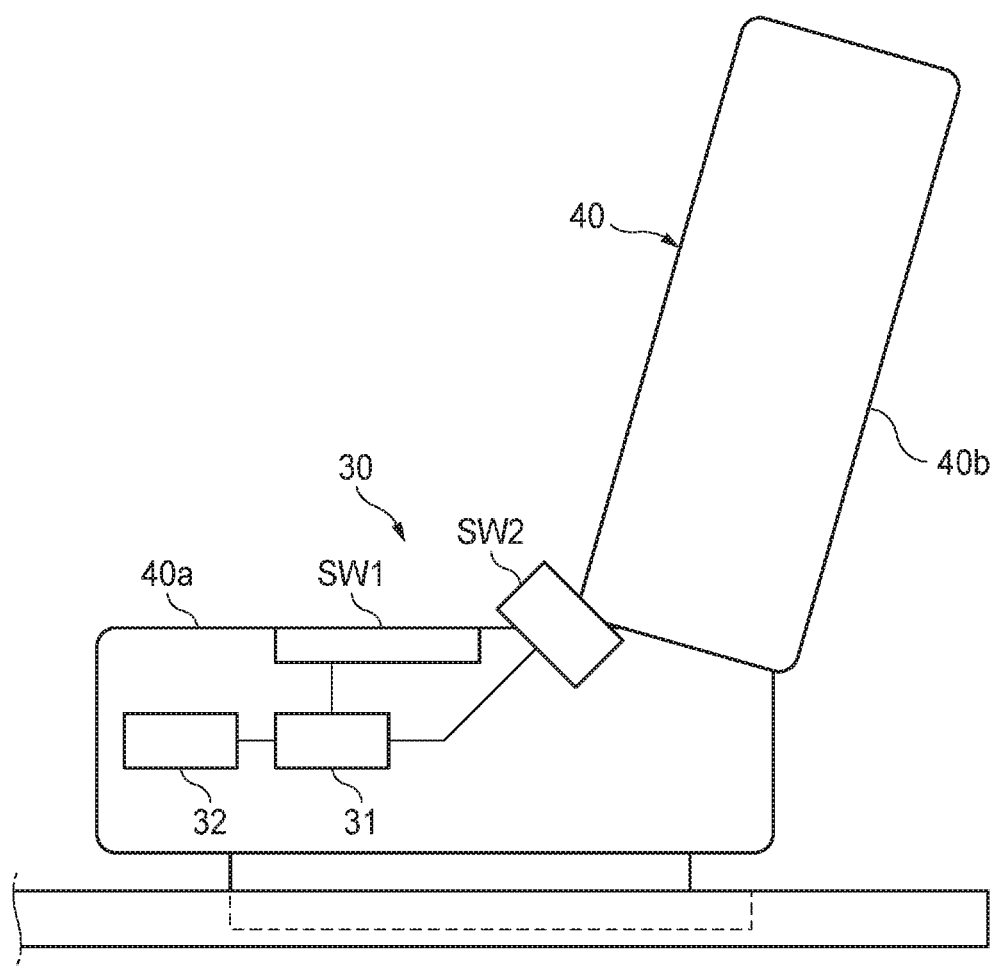
FIG. 3 is a front view showing an arrangement example of components of the seat inner unit in a longitudinal section of one seat.

FIG. 3 is a front view showing an arrangement example of components of the seat inner unit 30 in a longitudinal section of one seat 40. The seat 40 is provided to be movable in a front-rear direction on a floor of a vehicle body. The seat 40 includes a seat cushion 40a where the occupant can sit and a seat back 40b.

As shown in FIG. 3, the seating switch SW1 in the seat inner unit 30 is arranged in the vicinity of a seating position of the seat cushion 40a. The buckle switch SW2 is built in the buckle at a location where the tongue of the seat belt can be received. The slave control unit 31 and the BLE communication unit 32 are accommodated in the seat cushion 40a.

Arrangement Example of Main Components

Figure 4:
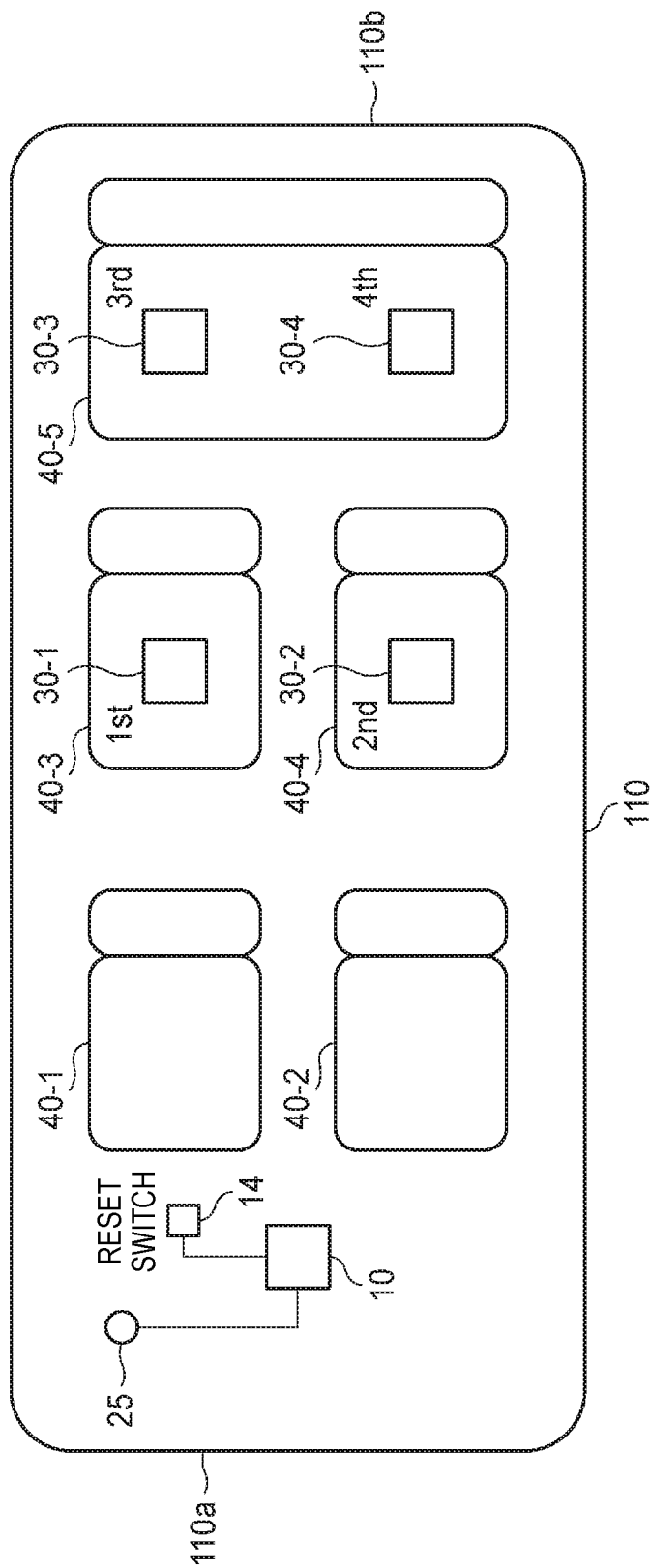
FIG. 4 is a plan view showing an arrangement example of main components in a state where inside of a vehicle body is viewed from above.

An arrangement example of main components in a state where inside of a vehicle body 110 equipped with the in-vehicle communication system 100 is viewed from above is shown in FIG. 4. In FIG. 4, a left side represents a front portion 110a of the vehicle body 110, and a right side represents a rear portion 110b.

In the example of the vehicle shown in FIG. 4, five seats 40-1, 40-2, 40-3, 40-4, and 40-5, which are arranged in three rows in the front-rear direction, are provided on the vehicle body 110. In this example, it is assumed that one occupant can be seated on each of the four seats 40-1, 40-2, 40-3, and 40-4, and two occupants can be seated on left and right sides of the rearmost seat 40-5. Such seat configuration and seating positions of the occupants change variously depending on differences between vehicle types, presence or absence of options, and the like.

In the example of FIG. 4, the four seat inner units 30-1, 30-2, 30-3, and 30-4 are provided at respective seating positions of the seats 40-3, 40-4, and 40-5. Since a driver can easily grasp presence or absence of seating and presence or absence of seat belt wearing for occupants of the seats 40-1 and 40-2 in a front row, the seat inner unit 30 is not provided in the seats 40-1 and 40-2. It is needless to say that the seat inner unit 30 may also be mounted in the seats 40-1 and 40-2.

The instrument panel inner unit 10 is accommodated in an instrument panel in front of the seat 40-1. The reset switch 14 and the seat belt warning function unit 25 are connected to the instrument panel inner unit 10. The seat belt warning function unit 25 is built in the meter unit 20.

In the example of FIG. 4, it is assumed that the four seat inner units 30-1, 30-2, 30-3, and 30-4, which have the same configuration and product number, are allocated as the first (1st), second (2nd), third (3rd) and fourth (4th) units, respectively.

Relationship Between Seat Positions and Registration Orders of Seat Inner Units

An example of a relationship between seat positions and registration orders of the seat inner units in situations where the numbers of ID registration units are different is shown in FIGS. 5A to 5D, FIGS. 5A, 5B, 5C, and 5D respectively correspond to situations where the numbers of ID registration units are 2, 3, 4, and 5.

When the in-vehicle communication system 100 shown in FIG. 1 is used, it is necessary to allocate and register (store) the unique ID information for each of the plurality of seat inner units 30-1 to 30-4 as preparation before use. However, the number of seats on the vehicle, seating positions of occupants, the number of the mounted seat inner units 30, and the like may change according to specifications of the vehicle.

Therefore, the number of units of the seat inner units 30 and seat positions of each unit, which are registered in such a system by the master control unit 11 of the instrument panel inner unit 10, also change according to the situations as shown in FIGS. 5A to 5D.

Figure 5A:
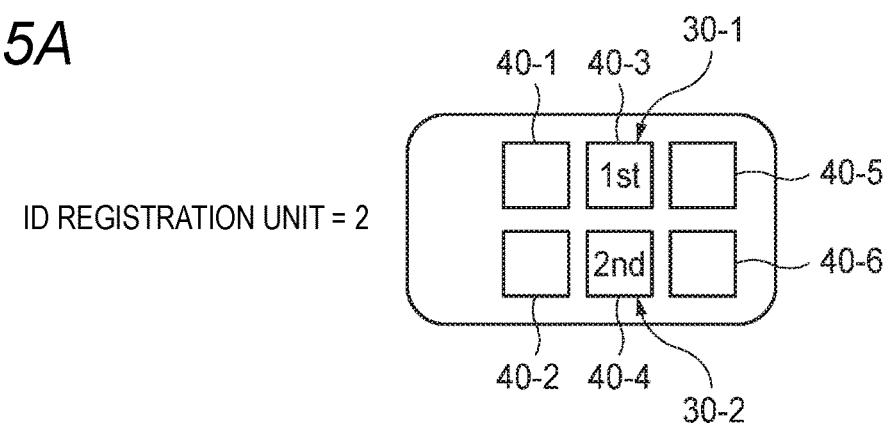
FIGS. 5A, 5B, 5C, and 5D are schematic views showing a relationship between seat positions and registration orders of seat inner units in situations where the numbers of ID registration units are different.

In the example of FIG. 5A, since a total number of the ID registration units is "2", it is assumed that the seat inner unit 30-1 existing in the seat 40-3 on a right side of a second row is allocated as the first unit, and the seat inner unit 30-2 existing in the seat 40-4 on the left side of the second row is allocated as the second unit.

Figure 5B:
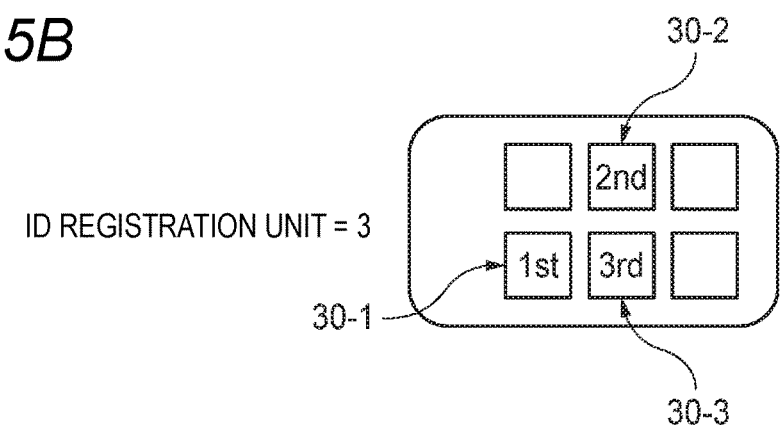

In the example of FIG. 5B, since the total number of the ID registration units is "3", it is assumed that the seat inner units 30-1, 30-2, and 30-3 at respective positions are allocated as the first, second, and third units, respectively.

Figure 5C:
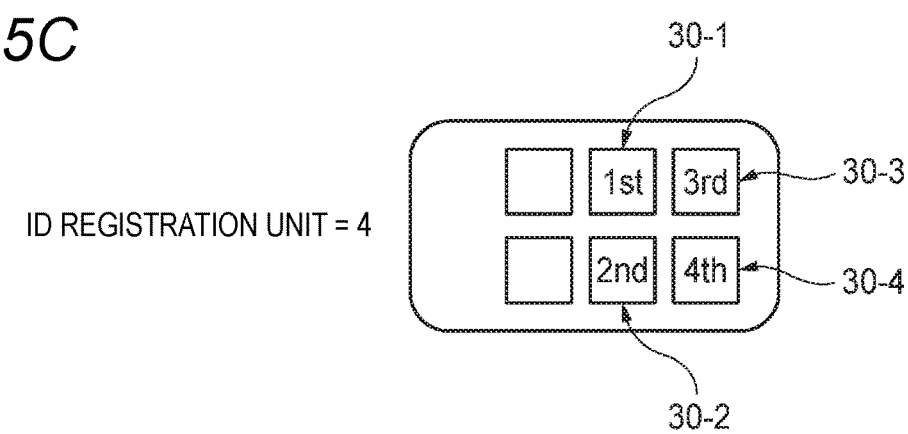

In the example of FIG. 5C, since the total number of the ID registration units is "4", it is assumed that the seat inner units 30-1, 30-2, 30-3, and 30-4 at respective positions are allocated as the first, second, third and fourth units, respectively.

Figure 5D:
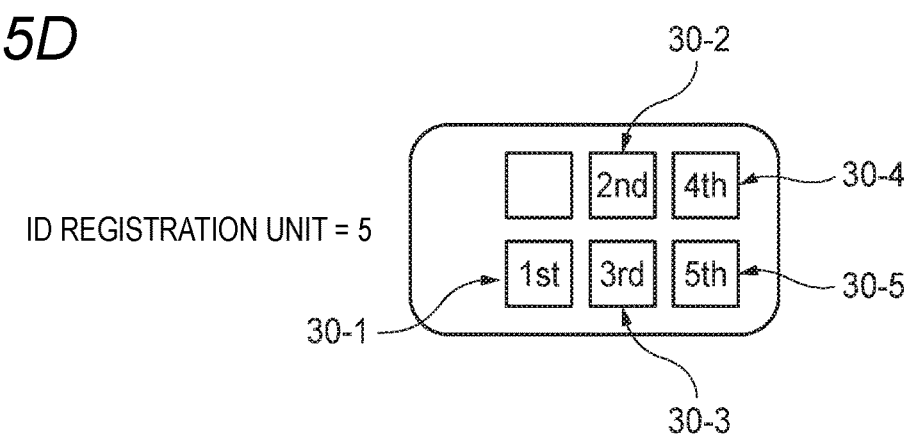

In the example of FIG. 5D, since the total number of the ID registration units is "5", it is assumed that the seat inner units 30-1, 30-2, 30-3, 30-4, and 30-5 at respective positions are allocated as the first, second, third, fourth, and fifth units, respectively.

Orders of the units are determined as shown in FIGS. 5A to 5D so as to facilitate allocation of the ID information. That is, an operator, such as a user, does not need to remember complicated operations, and IDs can be registered by a simple operation by repeatedly performing the same registration operation for the same number of times as the number of registrations.

Take-off and Wearing Patterns of Seat Belt

A list of seat belt take-off and wearing patterns, operation conditions, and instruction contents is shown in FIG. 6.

In the in-vehicle communication system 100 of the present embodiment, a user or the like can generate a special operation instruction through using the take-off and wearing patterns of the seat belt. In the example shown in FIG. 6, it is assumed that four types of take-off and wearing patterns PT0, PT1, PT2, and PT3 can be selectively used as needed.

The following complicated pattern may be used as a take-off and wearing pattern other than that shown in FIG. 6. After n1 time of take-off and wearing is performed in 10 seconds, wait 3 to 5 seconds, and then n2 time of take-off and wearing is performed in 10 seconds n1: seat row position *3 n2: left-right direction position of seat (the left is 1, the right is 2, and the center is 3) *3

In a case of the take-off and wearing pattern PT0 of FIG. 6, the pattern is considered to be present when a periodic seat belt wearing and taking off operation is detected at a rate of 5 times in 10 seconds. The seat belt wearing and taking off operation in this case corresponds to on and off switching of an electric signal of the buckle switch SW2. Therefore, by repeating the seat belt wearing and taking off operation, an operator such as a user can generate various instructions without operating a special button or the like. The take-off and wearing pattern PT0 means a seat side registration instruction in a case where the seat position is not designated.

Similarly, in a case of the take-off and wearing pattern PT1, the pattern is considered to be present when a periodic seat belt wearing and taking off operation is detected at a rate of 3 times in 10 seconds. The take-off and wearing pattern PT1 means a seat side registration instruction in a case where the seat position to be operated is on a left side of a rear seat.

In a case of the take-off and wearing pattern PT2, the pattern is considered to be present when a periodic seat belt wearing and taking off operation is detected at a rate of 6 times in 10 seconds. The take-off and wearing pattern PT2 means a seat side registration instruction in a case where the seat position to be operated is a center of the rear seat.

In a case of the take-off and wearing pattern PT3, the pattern is considered to be present when a periodic seat belt wearing and taking off operation is detected at a rate of 9 times in 10 seconds. The take-off and wearing pattern PT3 means a seat side registration instruction in a case where the seat position to be operated is on a right side of the rear seat.

Operation Sequence of System

Figure 7:
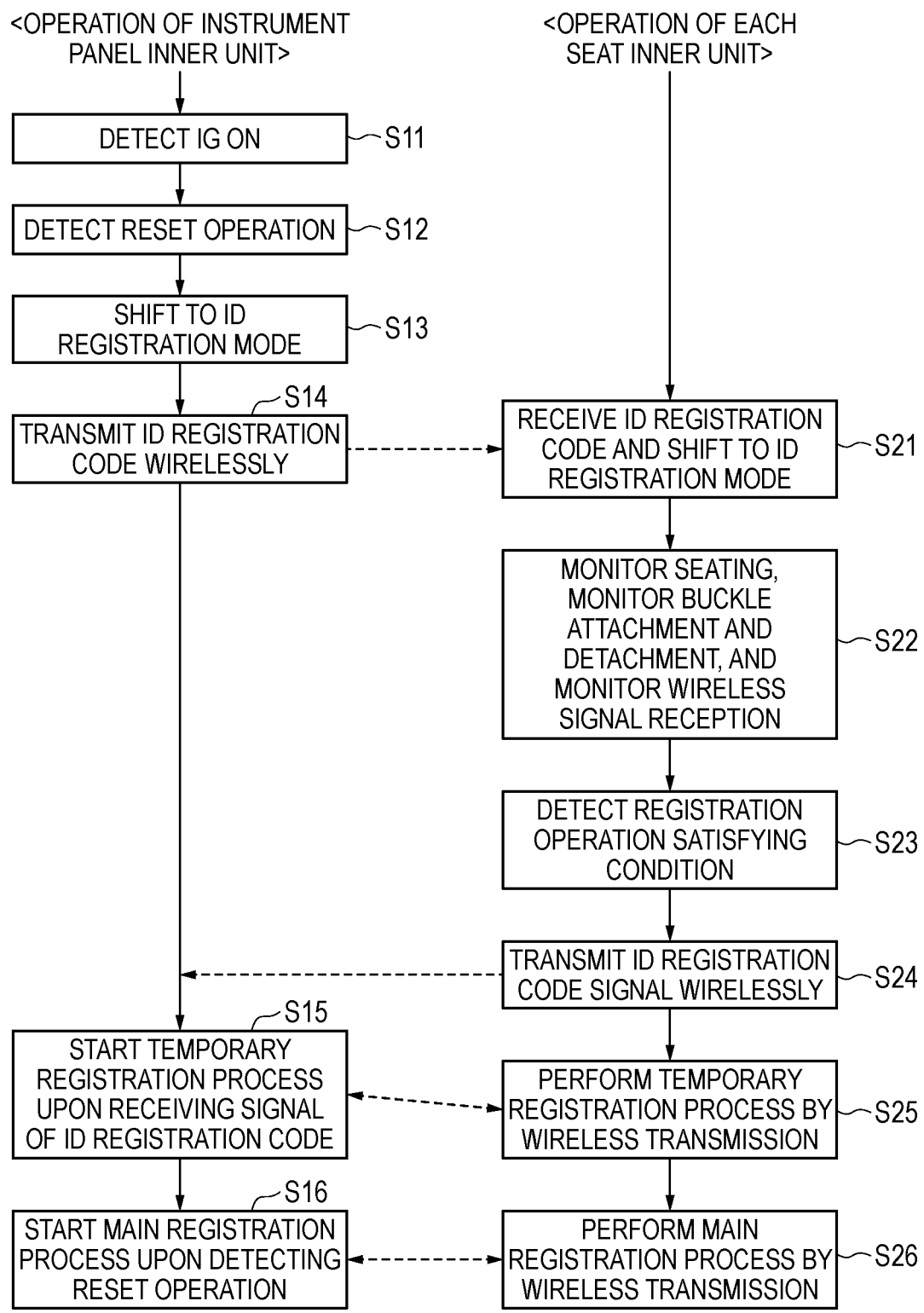
FIG. 7 is a sequence diagram showing an outline of an operation of registering ID information in each seat inner unit in the in-vehicle communication system shown in FIG. 1.

FIG. 7 shows an outline of an operation of registering ID information in each seat inner unit 30 in the in-vehicle communication system 100 shown in FIG. 1. Although an communication operation between the instrument panel inner unit 10 and one seat inner unit 30 is shown in the example of FIG. 7, communication having the same procedure as that in FIG. 7 is repeatedly performed between the plurality of seat inner units 30-1 to 30-4 and the like in an actual system. The operation of FIG. 7 will be described below.

When the ignition signal SG-IG of the host vehicle is turned on, the signal is detected by the instrument panel inner unit 10, and the process proceeds from step S11 to S12.

Next, when an operator such as a user operates the reset switch 14 or the like, the instrument panel inner unit 10 detects the operation and the process proceeds from step S12 to S13. It should be noted that it is desirable to add a restraint that the operation should be within a certain period of time (60 seconds) after the ignition signal SG-IG is turned on, or to specify a length of time of pressing the reset switch 14, for example. This is useful for preventing the in-vehicle communication system 100 from responding to an erroneous operation input. In a case where a software switch allocated on the meter unit 20 is used, it is desirable to make a change such that the process proceeds to step S13 after the instrument panel inner unit 10 detects a confirmation input of "yes/no" from the user.

The instrument panel inner unit 10 shifts to an "ID registration mode" in S13. In the "ID registration mode", the instrument panel inner unit 10 continues wireless transmission of an "ID registration code" (S14). In order to inform the user of a current state, a display of a tell-tale, that is, a warning light (W/L) is used. Specifically, the state is displayed through using a display device of the seat belt warning function unit 25 in the meter unit 20. For example, the state is notified by a repeated blinking pattern of lighting for 1 second and extinguishing for 1 second.

On the other hand, when each seat inner unit 30 receives a radio wave from the instrument panel inner unit 10 and detects reception of a predetermined "ID registration code", the seat inner unit 30 shifts to the "ID registration mode" in S21. Specifically, the slave control unit 31, the BLE communication unit 32, and the like in the seat inner unit 30 shift from a sleep mode to a wake-up mode, and the process proceeds to S22.

Then the seat inner unit 30 constantly and repeatedly monitors presence or absence of seating by the seating switch SW1, monitors wearing and take-off of the seat belt by the buckle switch SW2, monitors a reception state of wireless signals, and the like, and identifies whether a predetermined condition is satisfied (S22).

As a specific example, at a position of the first seat inner unit 30-1, a state of "seated" is detected within a predetermined time (for example, 10 minutes) after shifting to the "ID registration mode", and the seat belt take-off and wearing pattern PT0 (see FIG. 6) or the like is detected in step S23 based on a signal of the buckle switch SW2, then the process proceeds to S24. Then the seat inner unit 30 wirelessly transmits a trigger signal of the "ID registration code" to the instrument panel inner unit 10 in S24.

When the instrument panel inner unit 10 receives the trigger signal of the "ID registration code" from each seat inner unit 30 as a wireless signal, the process proceeds to step S15 to start processing for temporarily registering the ID information. That is, wireless communication is performed between the seat inner unit 30 and the instrument panel inner unit 10 to determine temporary ID information for each unit, and the temporary ID information is temporarily registered by the instrument panel inner unit 10 and the seat inner unit 30.

When the seat inner unit 30 transmits the trigger signal of the "ID registration code" by the seat belt take-off and wearing pattern PT0, the instrument panel inner unit 10 cannot specify a corresponding seat position or unit position. Therefore, in the case of the seat belt take-off and wearing pattern PT0, the instrument panel inner unit 10 sequentially processes the seat inner units 30 at a first seat position (1st), a second seat position (2nd), a third seat position (3rd), . . . in an order as shown in FIGS. 5A to 5D.

That is, the instrument panel inner unit 10 performs the processes of S14 and S15 on each of the plurality of seat inner units 30, and the seat inner units 30 at each seat position sequentially perform the processes of S21 to S25. A display of the warning light is used to inform the user how many temporary registrations have been completed.

After the processes of the temporary registrations for all of the plurality of seat inner units 30 are completed, the instrument panel inner unit 10 starts a main registration process of the ID information for all of the plurality of seat inner units 30 when the instrument panel inner unit 10 detects an operation of the reset switch 14 or the like in S16. That is, while the wireless communication is performed between the instrument panel inner unit 10 and each of the plurality of seat inner units 30, ID information which is unique to each vehicle and unique to each unit is allocated to the unit at each position.

It should be noted that the "min registration" process is performed after the "temporary registration" process as described above, so as to prevent the system from being used in a state where there is a unit in which no ID information is registered. That is, since the process proceeds to the "main registration" after it is confirmed that the ID information has been temporarily registered in all the seat inner units 30, the in-vehicle communication system 100 is actually used after the unique ID information is registered in all the seat inner units 30.

However, for example, any one seat inner unit 30 among the plurality of seat positions may be replaced due to a failure, a change in a component, or the like after the use of the in-vehicle communication system 100 is started. In such a case, although the unique ID information is already registered in the seat inner units 30 other than the newly exchanged one, it is necessary to perform the processing of FIG. 7 for all the seat inner units 30 when the ID information is registered again according to the order of the seat positions determined in advance as shown in FIGS. 5A to 5D.

However, for example, in cases of using the take-off and wearing patterns PT1 to PT3 shown in FIG. 6, the seat positions can be specified by types of the patterns, so it is possible to perform the ID information registration process only for the newly replaced seat inner unit 30.

For example, when one seat inner unit 30 is replaced, after the instrument panel inner unit 10 performs S14, the user is seated at the corresponding seat position and repeats the seat belt take-off and wearing operation at this position to match a corresponding pattern among the take-off and wearing patterns PT1 to PT3, for example. In this case, since information of the take-off and wearing pattern corresponding to the trigger signal of the ID registration code transmitted by the seat inner unit 30 in S24 is included, the instrument panel inner unit 10 can recognize the take-off and wearing pattern of the received trigger signal and specify the seat position of the seat inner unit 30 where the ID information should be registered. Therefore, even if the processes of S14, S15, and S21 to S25 are not repeated for the same number of times as the total number of the seat inner units 30, the process can proceed to S16 to perform the main registration of the ID information.

Before proceeding from S15 to S16, for example, the instrument panel inner unit 10 informs the user of the number and the positions of the seat inner units 30 for which the temporary registration has been completed so far through using the display of the warning light. As a result, the registration operation of the user can be supported.

Detailed Operation Flow

Operation of Instrument Panel Inner Unit 10

Figure 8:
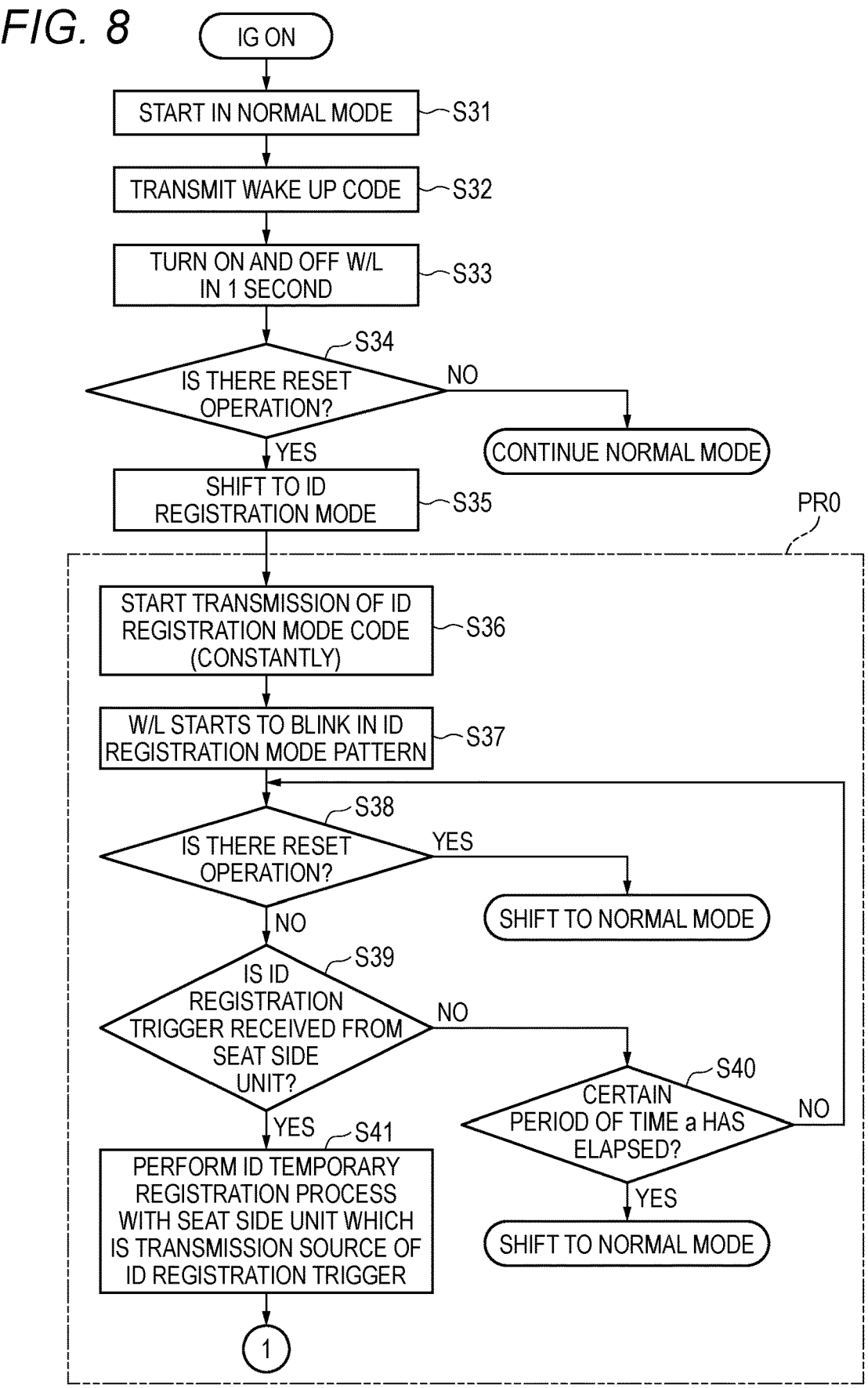
FIG. 8 is a flowchart showing a part of operations of the instrument panel inner unit.
Figure 9:
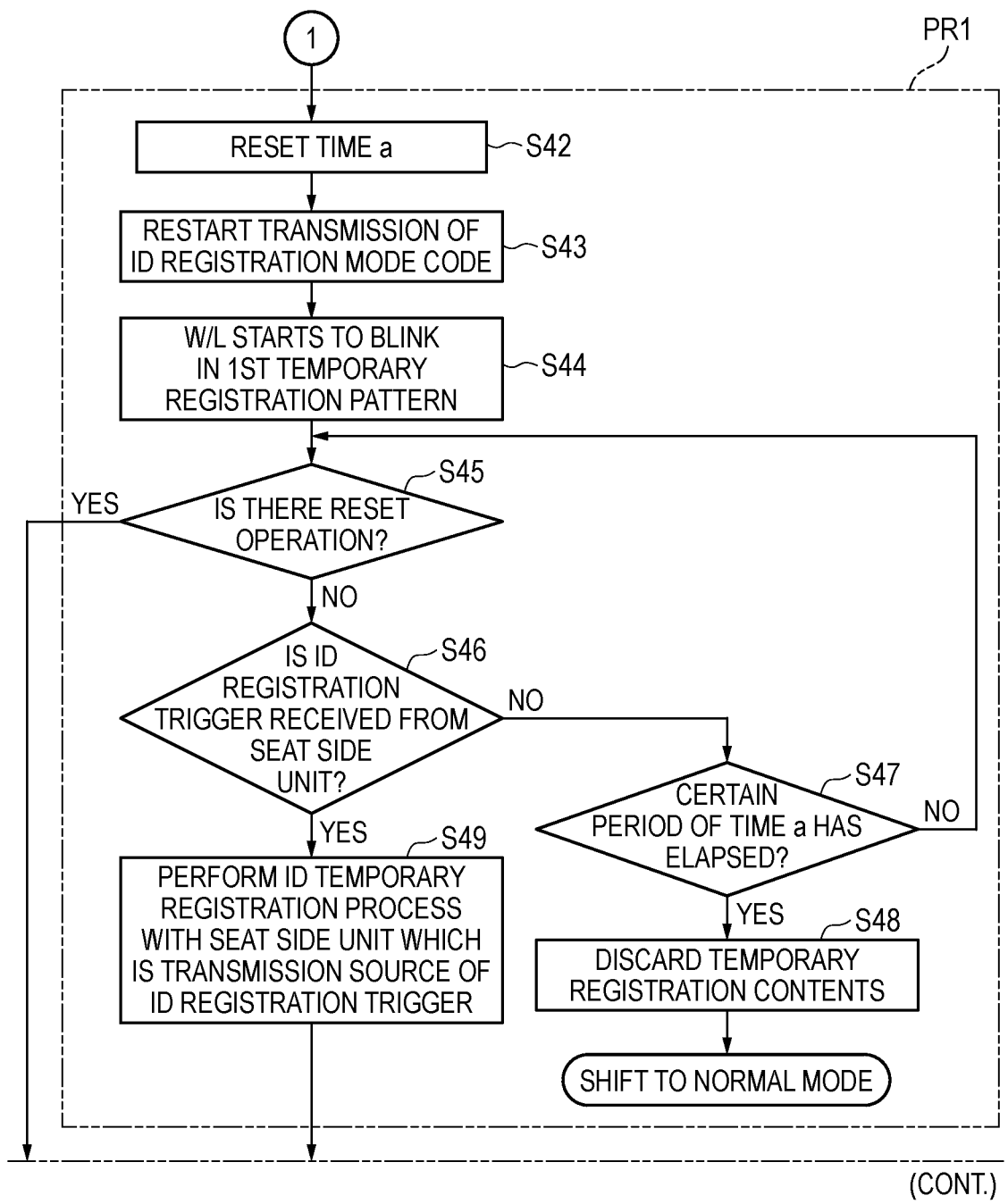
FIG. 9 is a flowchart showing a part of the operations of the instrument panel inner unit.
Figure 10:
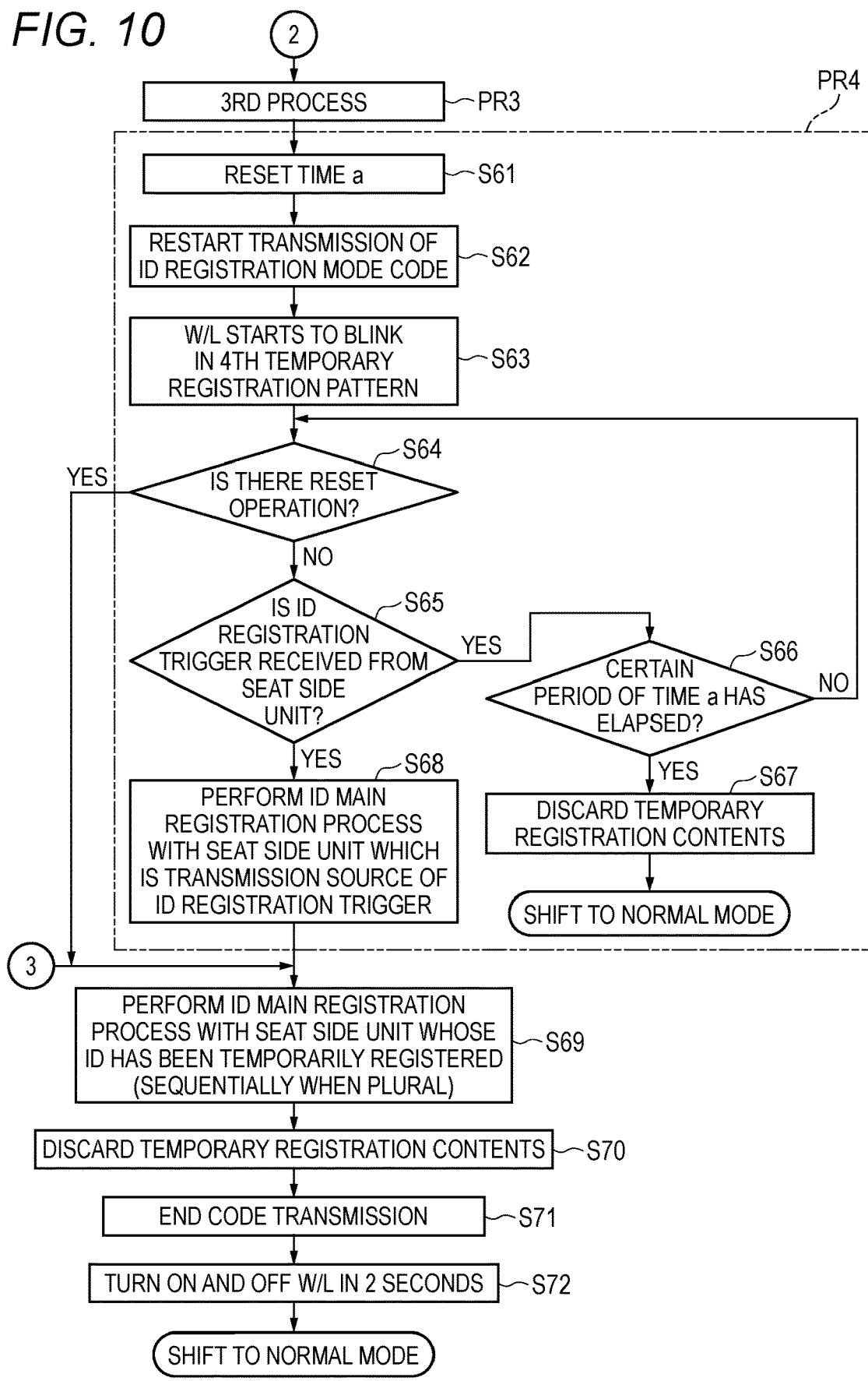
FIG. 10 is a flowchart showing a part of the operations of the instrument panel inner unit.

Details of operations of the instrument panel inner unit 10 are shown in FIGS. 8, 9, and 10. Operations of FIGS. 8 to 10 will be described below.

When the ignition signal SG-IG is turned on, the master control unit 11 of the instrument panel inner unit 10 starts an operation from step S31 in FIG. 8. The master control unit 11 starts in a normal mode (S31), transmits a wake-up code to the BLE communication unit 12 (S32), and turns on and off the warning light (W/L) on the meter unit 20 for one second to check display bulbs (S33).

When the master control unit 11 detects a predetermined reset operation of the reset switch 14 or the like, the process proceeds from S34 to S35, and the master control unit 11 is shifted to the "ID registration mode". When the reset operation is not detected, the normal mode is continued.

After shifting to the "ID registration mode", the master control unit 11 performs a zeroth process PR0. That is, wireless transmission of an ID registration mode code is started through using the BLE communication unit 12 first (S36). Such transmission is constantly repeated. Moreover, the warning light is started to blink in an ID registration mode pattern (S37). When the reset operation is detected in S38, the mode is shifted to the normal mode. When no ID registration trigger is received from the seat inner unit 30 within a predetermined period of time a after shifting to the "ID registration mode", S40 is passed, and the mode is shifted to the normal mode.

When the master control unit 11 receives the ID registration trigger from any one of the seat inner units 30, the master control unit 11 performs an ID temporary registration process with the seat inner unit 30 which is a transmission source of the ID registration trigger (S41). In a case where seat position information is included in the ID registration trigger from the seat inner unit 30, the ID temporary registration process is performed in association with the seat position. In a case where the seat position information is not included, the ID temporary registration process is performed in a seat position order determined in advance.

Next, the master control unit 11 proceeds to S42 shown in FIG. 9, and performs a first process PR1. That is, the time a is reset (S42), and the wireless transmission of the ID registration mode code is restarted through using the BLE communication unit 12 (S43). Further, the warning light is started to blink in a 1st temporary registration pattern (S44). When the reset operation is detected, the process proceeds from S45 to the ID main registration process. When the ID registration trigger is not received from the seat inner unit 30 within a predetermined period of time a after resetting the time a contents which are temporarily registered so far are discarded in S48, and the mode is shifted to the normal mode.

When the master control unit 11 receives the ID registration trigger from any one of the seat inner units 30 (S46), the master control unit 11 performs the ID temporary registration process with the seat inner unit 30 which is the transmission source of the ID registration trigger (S49). In the case where the seat position information is included in the ID registration trigger from the seat inner unit 30, the temporary registration process is performed in association with the seat position. In the case where the seat position information is not included, the ID temporary registration process is performed in the seat position order determined in advance.

After completion of the first process PR1, the master control unit 11 continues a second process PR2. The second process PR2 is the same as the first process PR1 except that the seat position to be temporarily registered is changed and the blinking pattern of the warning light is different. Further, after completion of the second process PR2, the master control unit 11 continues a third (3rd) process PR3. The third process PR3 is also the same as the first process PR1 except that the seat position to be temporarily registered is changed and the blinking pattern of the warning light is different.

After completion of the third process PR3, the master control unit 11 continues a fourth process PR4. In this example, it is assumed that the fourth process PR4 corresponds to a last seat position. Therefore, when the ID registration trigger from the seat inner unit 30 at the fourth seat position is received (S65), the ID temporary registration process is omitted, and the ID main registration is performed in S68.

When the process proceeds to S69, the master control unit 11 performs wireless communication with the seat inner unit 30 whose ID has been temporarily registered, and performs the ID main registration process. When there are a plurality of seat inner units 30 in a temporarily registered state, the ID main registration process is performed sequentially for the units.

After completion of the ID main registration process, the master control unit 11 discards all contents which are temporarily registered so far (S70), the wireless signal code transmission from the instrument panel inner unit 10 is completed (S71), the warning light is turned on for 2 seconds and then turned off (S72), and the mode is shifted to the normal mode.

Operations of Each Seat Inner Unit 30

Figure 11:
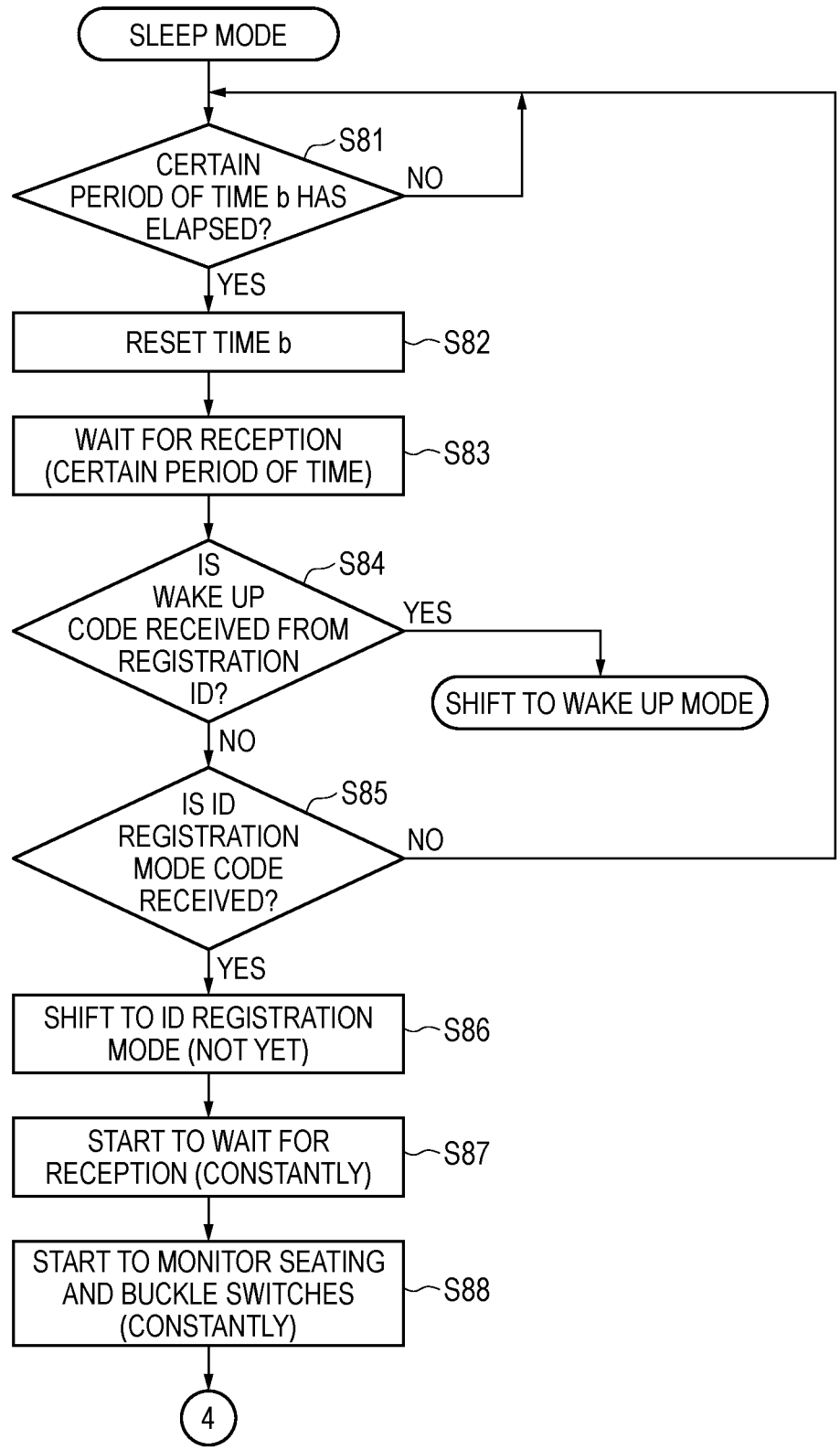
FIG. 11 is a flowchart showing a part of operations of each seat inner unit.
Figure 12:
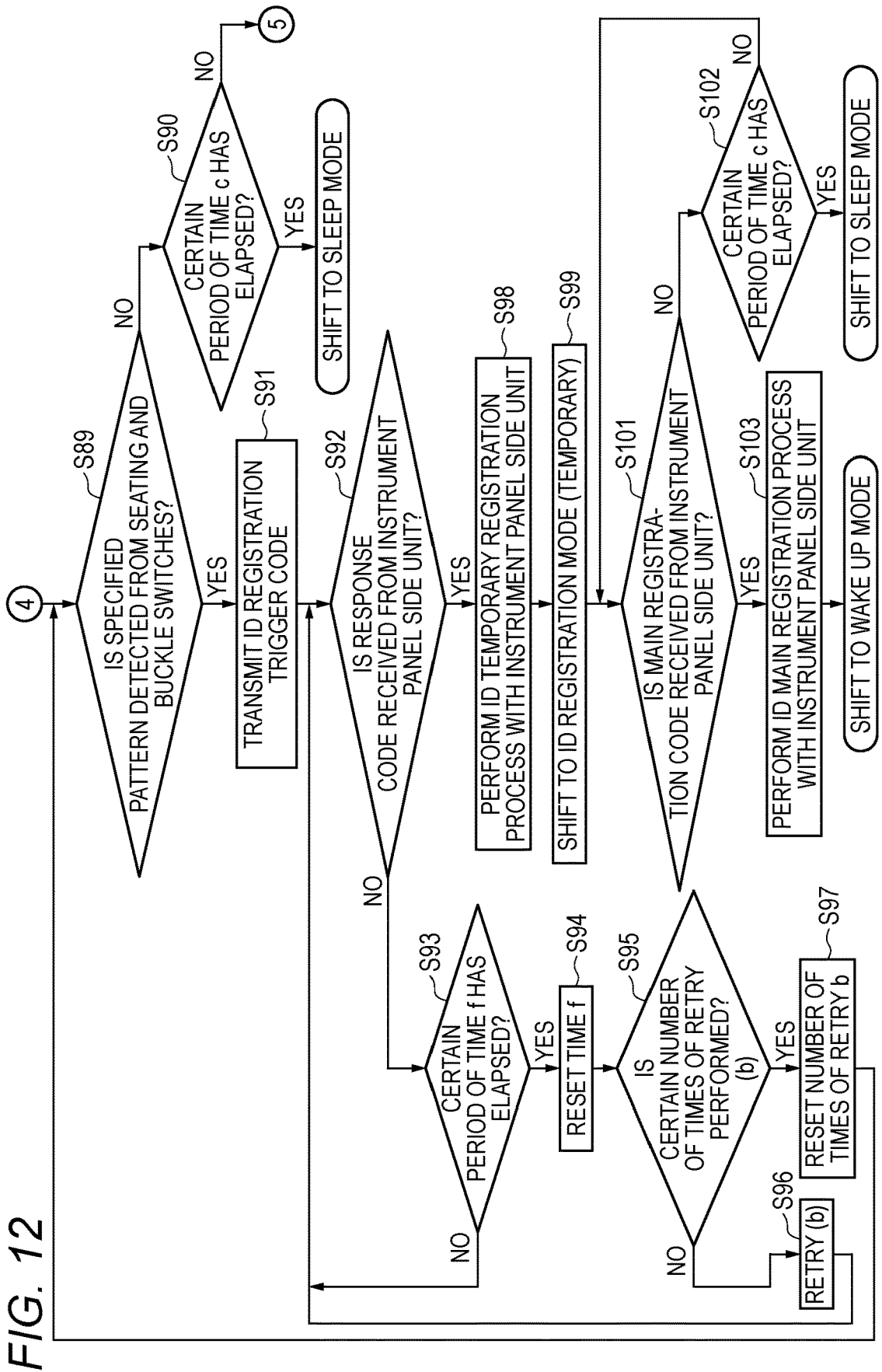
FIG. 12 is a flowchart showing a part of the operations of each seat inner unit.
Figure 13:
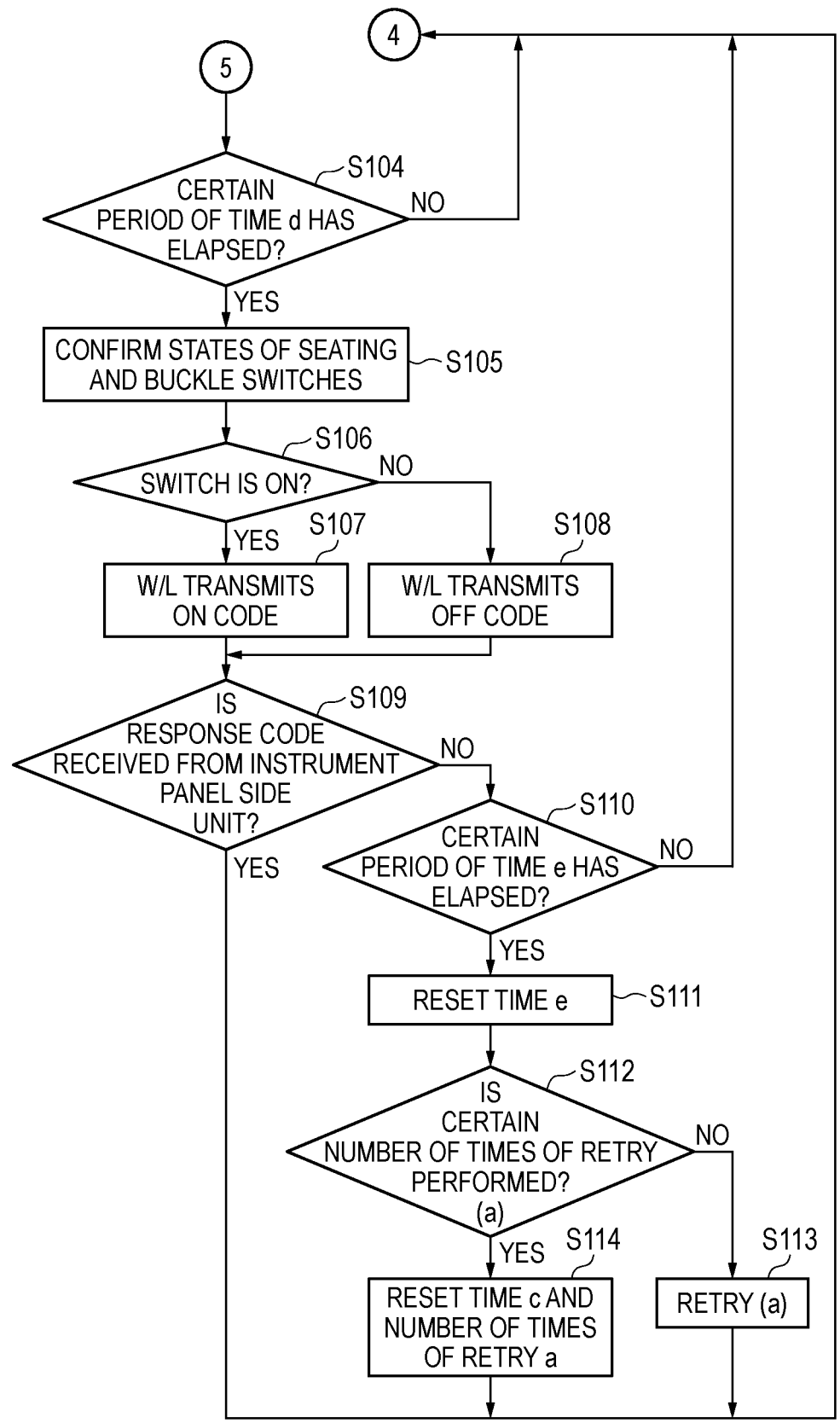
FIG. 13 is a flowchart showing a part of the operations of each seat inner unit.

Details of operations of each seat inner unit 30 are shown in FIGS. 11, 12, and 13. Operations of FIGS. 11 to 13 will be described below.

The slave control unit 31 and the BLE communication unit 32 in each of the seat inner units 30 are in the sleep mode during standby to reduce power consumption. In the sleep mode, the slave control unit 31 repeatedly performs step S81, and the process proceeds to S82 when a predetermined time period b has elapsed. In S82, the time b is reset, and reception standby is performed for a predetermined time in S83.

When the slave control unit 31 receives the wake-up code from a transmission source of a registered specific ID, that is, the instrument panel inner unit 10, the slave control unit 31 is shifted from S84 to the wake-up mode.

When the slave control unit 31 receives the ID registration mode code from the instrument panel inner unit 10, the slave control unit 31 is shifted to an ID registration mode (not yet) (S86). Further, the reception standby is started (S87). Thereafter, the reception standby is constantly performed. The slave control unit 31 starts monitoring of the seating switch SW1 and the buckle switch SW2 (S88). Thereafter, such monitoring is constantly performed.

Based on monitoring states of the seating switch SW1 and the buckle switch SW2 at the corresponding seat position, the slave control unit 31 identifies whether a predetermined pattern is detected in S89. For example, when any one pattern of the take-off and wearing patterns PT0 to PT3 of FIG. 6 is detected in a seating state, it is assumed that an instruction is given from the user or the like, and the process proceeds to S91. When a state where no such pattern is detected continues for a predetermined period of time c, S90 is passed and the mode is shifted to the sleep mode.

When the slave control unit 31 detects the instruction from the user or the like, the slave control unit 31 wirelessly transmits an ID registration trigger code to the instrument panel inner unit 10 through using the BLE communication unit 32 (S91). The ID registration trigger code may include a pattern code representing types of the take-off and wearing patterns, such as PT0 to PT3.

The slave control unit 31 identifies whether a response code with respect to the ID registration trigger code transmitted in S91 is received from the instrument panel inner unit 10 in S92. When a state where no response code is received continues for a predetermined period of time f, the time f is reset in S94, and retry is performed for a certain number of times (S95 to S97).

When the slave control unit 31 receives the response code, the slave control unit 31 communicates with the instrument panel inner unit 10 in S98, and performs the ID temporary registration process for itself. Then the slave control unit 31 is shifted to the ID registration mode (temporary) (S99).

Thereafter, the slave control unit 31 waits for reception of a main registration code from the instrument panel inner unit 10. When the predetermined time c has elapsed without receiving the main registration code, the mode is shifted to the sleep mode. When the main registration code is received, the slave control unit 31 communicates with the instrument panel inner unit 10, performs the ID main registration process (S103), and shifts to the wake-up mode.

On the other hand, in a state where no specified pattern is detected in S89, the slave control unit 31 proceeds to S105 of FIG. 13 after a predetermined period of time d has elapsed and checks states of the seating switch SW1 and the buckle switch SW2. When the buckle switch SW2 is on in the seating state, a warning-light-on code is transmitted in S107, and when the buckle switch SW2 is off, a warning-light-off code is transmitted in S108.

When a state where the slave control unit 31 does not receive the response code from the instrument panel inner unit 10 continues for a predetermined period of time e, the slave control unit 31 resets the time e in S111, and performs retry for a predetermined number of times (S112 to S114).

Time Series Change of State: Operation Example 1

Figure 14:
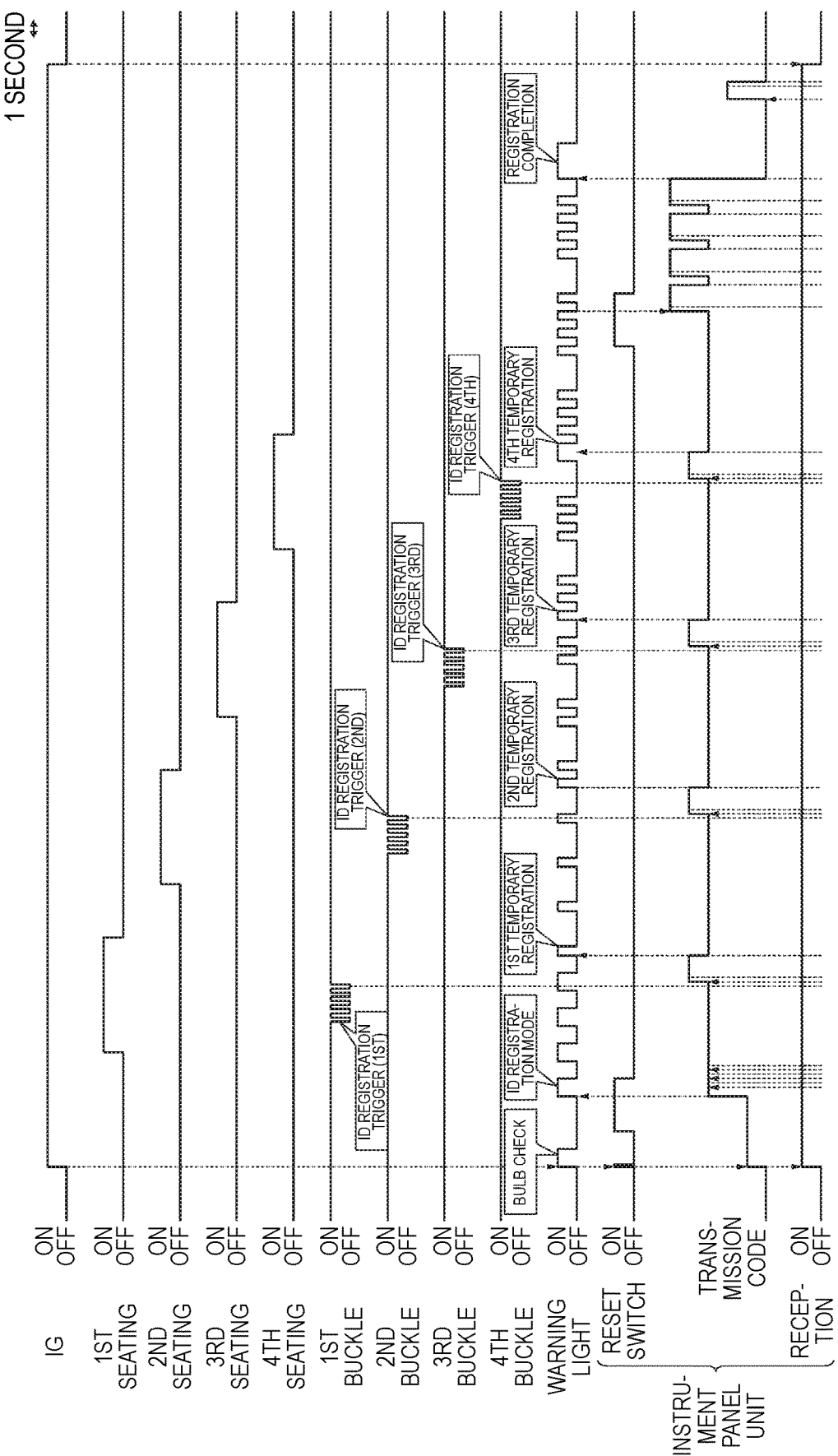
FIG. 14 is a time chart showing a part of time series changes of a state of an operation example 1 of the in-vehicle communication system.
Figure 15:
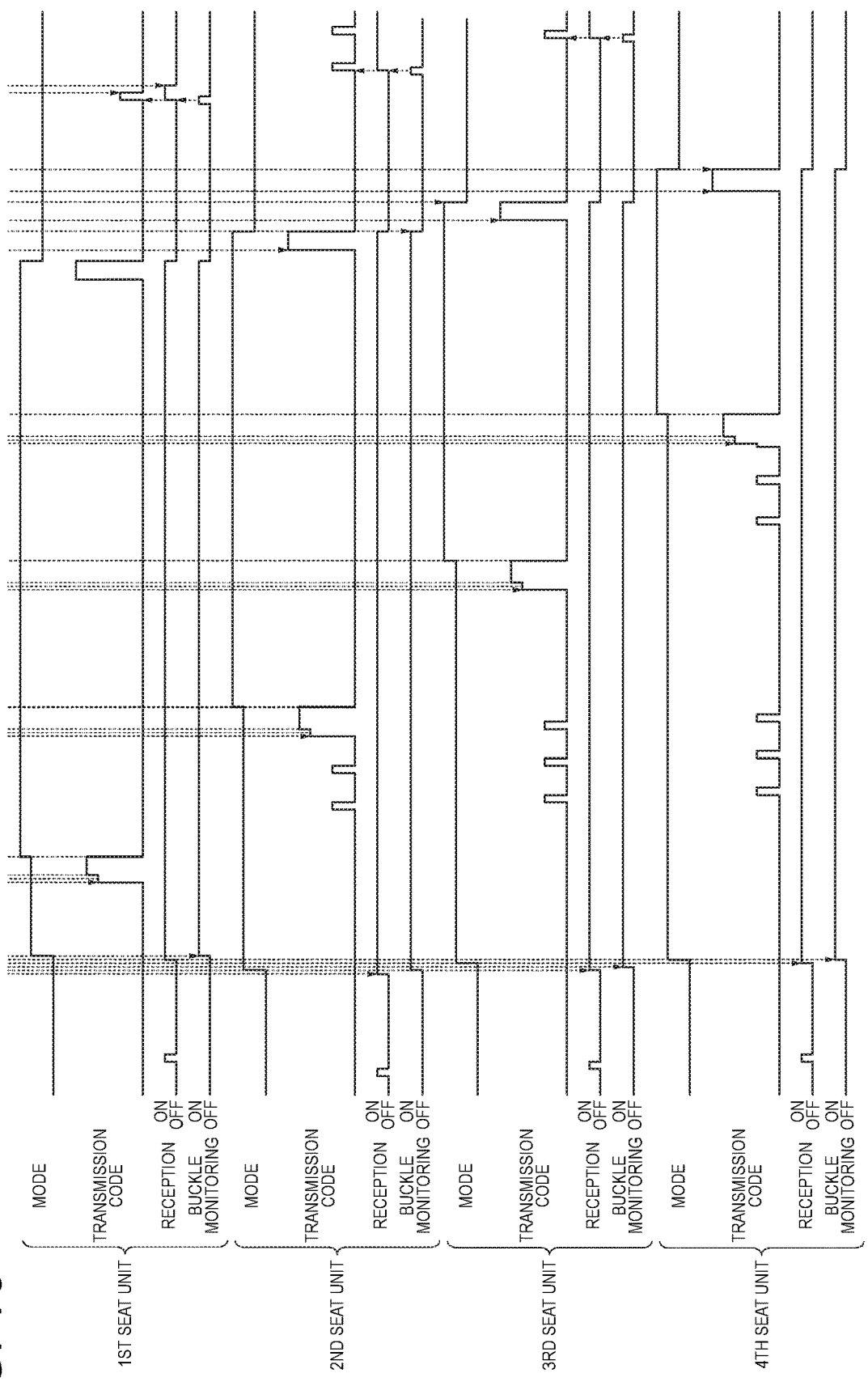
FIG. 15 is a time chart showing a part of the time series changes of state of the operation example 1 of the in-vehicle communication system.

Time series changes of a state of an operation example 1 of the in-vehicle communication system 100 are shown in FIGS. 14 and 15. In the operation example 1, it is assumed that the ID information is sequentially allocated to the seat inner units 30 at the four seat positions from 1st to 4th.

In FIGS. 14 and 15, a horizontal axis represents a common time. Differences in vertical axis direction positions of a "transmission code" of the instrument panel inner unit 10 in FIG. 14 indicate differences between "no transmission", "wake-up", "reception response", "ID registration mode", "temporary registration", and "main registration" in order from bottom to top. Differences in vertical axis direction positions of "modes" of the seat inner units 30 in FIG. 15 indicate differences between "sleep", "wake-up", "ID registration (not yet)", and "ID registration (temporary)" in order from bottom to top. Differences in vertical axis direction positions of "transmission codes" of the seat inner units 30 in FIG. 15 indicate differences between "no transmission", "wake-up", "seat belt warning off", "seat belt warning on", "ID registration trigger", "temporary registration", and "main registration" in order from bottom to top.

As shown in FIG. 14, after an ignition (IG) is turned on, seating states of the 1st to 4th seat positions are sequentially changed to on. That is, such a situation corresponds to a situation where an operator such as a user who performs ID information registration is sequentially seated at each seat position.

When the seating states of the 1st to 4th seat positions are on, a periodic on and off change pattern appears in the buckle switch SW2 at each position. That is, such a situation corresponds to a situation where the operator such as the user who performs the ID information registration repeats an operation of wearing and taking off the seat belt at each seat position in a predetermined pattern. As a result, the "ID registration trigger" is sequentially generated in the seat inner unit 30 at each seat position.

State changes of on and off (lighting/extinguishing) of the warning light on the meter unit 20 and the like that can be visually recognized by the user or the like are used to notify the user or the like of a current state of the in-vehicle communication system 100. In the example of FIG. 14, "bulb check", "ID registration mode", "1st temporary registration", "2nd temporary registration", "3rd temporary registration", "4th temporary registration", and "registration completion" are sequentially displayed by the on and off change of the warning light.

The "transmission code" of the instrument panel inner unit 10 changes in an order of "no transmission", "wake-up", "ID registration mode", and "temporary registration". After completion of the "temporary registration" for each of the 1st to 4th, the "main registration" is sequentially performed for the 1st to 4th seat inner units 30. After all the main registration ends, the "reception response" of the instrument panel inner unit 10 is generated. While the ignition is on, a reception state of the instrument panel inner unit 10 is constantly on, and states of the seat inner units 30 can be monitored.

As shown in FIG. 15, states of the 1st to 4th seat inner units 30 are sequentially changed. Modes of the 1st to 4th seat inner units 30 are changed in an order of "sleep", "ID registration (not yet)", and "ID registration (temporary)".

The "transmission code" of each seat inner unit 30 becomes "temporary registration" due to communication with the instrument panel inner unit 10 after generation of the "ID registration trigger" upon detecting a signal of the buckle switch SW2 located at the corresponding seat position, that is, a predetermined seat belt take-off and wearing pattern. Thereafter, when all the temporary registration of the 1st to 4th is completed, the mode is shifted to the "main registration" by communication with the instrument panel inner unit 10.

Since the in-vehicle communication system 100 uses radio waves to perform the wireless communication, there is a possibility that each seat inner unit 30 of the host vehicle receives not only wireless signals of devices on the host vehicle but also wireless signals from the instrument panel inner unit 10 mounted on another vehicle which is in the vicinity of the host vehicle. It is also conceivable that the seat inner unit 30 is shifted to the "ID registration mode" upon receiving a signal from the instrument panel inner unit 10 of the other vehicle.

Therefore, even when the mode is the "ID registration (not yet)", each seat inner unit 30 periodically transmits a signal indicating a state of the seat belt toward the instrument panel inner unit 10. Even if there is no response from the instrument panel inner unit 10 during the periodic transmission of the signal indicating the state of the seat belt, each seat inner unit 30 is not immediately shifted to the sleep mode, but performs retry for a certain number of times.

In a state where the seat inner unit 30 at each seat position detects an ID registration trigger of an operation of the buckle switch SW2 and the mode thereof is shifted to the "ID registration (temporary)", it is determined that the shifting is not caused by a malfunction, and the periodic transmission of the signal indicating the state of the seat belt is not performed.

Warning Light Blinking Pattern

Figure 16:
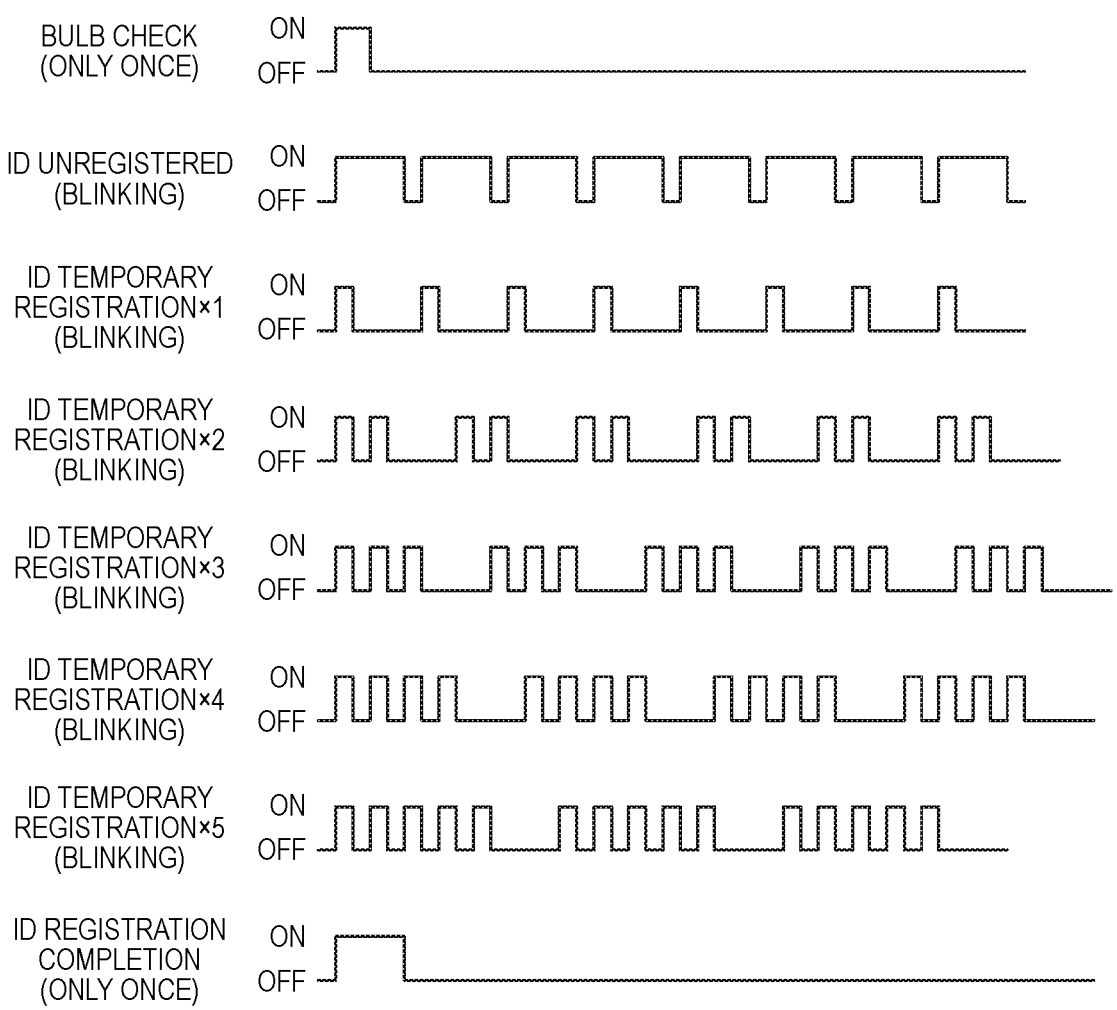
FIG. 16 is a time chart showing an example of a warning light blinking pattern in an operation of registering ID information in each seat inner unit.

An example of warning light blinking patterns during the operation of registering the ID information in each seat inner unit 30 is shown in FIG. 16.

In the example of FIG. 16, eight types of warning light blinking patterns including "bulb check", "ID unregistered", "temporary registration x1", "temporary registration x2", "temporary registration x3", "temporary registration x4", "temporary registration x5", and "ID registration completion" are shown.

As shown in FIG. 16, in the "bulb check" warning light blinking pattern, the warning light is turned on only once and then turned off. In the "ID unregistered" warning light blinking pattern, the warning light blinks repeatedly by repeating a long lighting section and a short extinguishing section.

In the "temporary registration x1" warning light blinking pattern, the warning light blinks repeatedly by repeating a short lighting section and a long extinguishing section. In the "temporary registration x2" warning light blinking pattern, the warning light blinks so as to intermittently repeat two consecutive blinks. In the "temporary registration x3" warning light blinking pattern, the warning light blinks so as to intermittently repeat three consecutive blinks. In the "temporary registration x4" warning light blinking pattern, the warning light blinks so as to intermittently repeat four consecutive blinks. In the "temporary registration x5" warning light blinking pattern, the warning light blinks so as to intermittently repeat five consecutive blinks. In the "ID registration completion" warning light blinking pattern, the warning light is turned on only once for a long time and then turned off.

Therefore, an operator such as a user can grasp a current state of the in-vehicle communication system 100, that is, whether the state is the ID unregistered state, or how many registrations among the first to fifth temporary registrations have been completed, or the like by recognizing differences in the blinking patterns as shown in FIG. 16.

State Time Series Change: Operation Example 2

Figure 17:
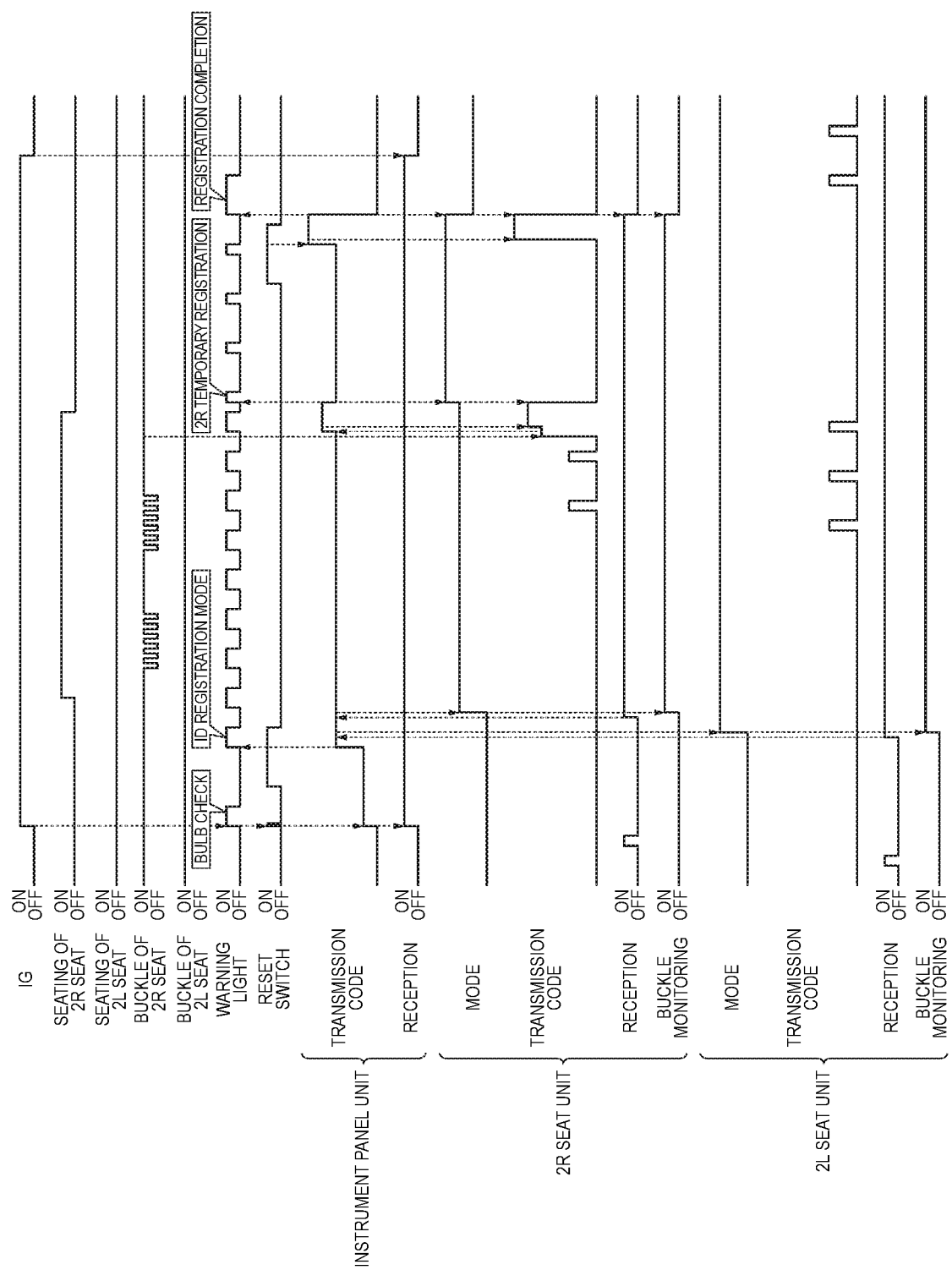
FIG. 17 is a time chart showing time series changes of a state of an operation example 2 of the in-vehicle communication system.

Time series changes of a state of an operation example 2 of the in-vehicle communication system 100 are shown in FIG. 17. In the operation example 2, it is assumed that the seat inner units 30, which are targets of the ID registration, are present at each position of a second row right seat "2R" and a second row left seat "2L" on the vehicle.

In FIG. 17, a horizontal axis represents a common time. Differences in vertical axis direction positions of a "transmission code" of the instrument panel inner unit 10 in FIG. 17 indicate differences between "no transmission", "wake-up", "reception response", "ID registration mode", "temporary registration", and "main registration" in order from bottom to top. Differences in vertical axis direction positions of "modes" of the seat inner units 30 in FIG. 17 indicate differences between "sleep", "wake-up", "ID registration (not yet)", and "ID registration (temporary)" in order from bottom to top. Differences in vertical axis direction positions of "transmission codes" of the seat inner units 30 in FIG. 17 indicate differences between "no transmission", "wake-up", "seat belt warning off", "seal belt warning on", "ID registration trigger", "temporary registration", and "main registration" in order from bottom to top.

In the example shown in FIG. 17, after the ignition (IG) is turned on and the user or the like operates the reset switch 14 to enter the "ID registration mode", the user or the like is seated in the "2R" seat, and thus the seating switch SW1 at this position is turned on. When the wearing and taking off operation of the seat belt of the same seat is performed while the seating switch SW1 is on, an instruction can be given to the in-vehicle communication system 100 by a signal generated by the buckle switch SW2.

In the example of FIG. 17, on and off of the signal of the buckle switch SW2 of the "2R" seat is continuously repeated for six times, and then the on and off is continuously repeated for six times again after a pause period. The take-off and wearing pattern of such a signal indicates the position of the "2R" seat. Here, the first six on and off repetition patterns represent a value (=6) which is three times the value of a front-rear direction position "2" (seat row), and the latter six on and off repetition patterns represent a value (=6) which is three times the value of a left-right direction seat position "R: 2". That is, a combination of the first "repetition of six times of on and off, the pause period, and the latter "repetition of six times of on and of" corresponds to the position of the "2R" seat.

During processing of the slave control unit 31 of the seat inner unit 30, the on and off of the signal of the buckle switch SW2 is detected, and when a predetermined time (for example, 3 seconds) has elapsed since the last on of the signal, the process proceeds to the next step.

In the example of FIG. 17, the slave control unit 31 detects the first six on and off repetitions of the signal of the buckle switch SW2 and recognizes that the seat position is in the second row from the number of times "6" of the repetitions. The process proceeds to the next step after the elapse of 3 seconds, and detection of a horizontal direction seat position is performed. Since the number of times of the latter repetitions is "6", it is recognized that the seat is a right seat R (2×3=6). Thereafter, the ID registration trigger is transmitted.

Since the seat inner unit 30 of the host vehicle may be shifted to the "ID registration mode" in response to a signal transmitted by the instrument panel inner unit 10 on another vehicle, a signal indicating a seat belt warning state is periodically transmitted even if the mode is the "ID registration (not yet)" to prevent malfunctions.

On the other hand, when the seat inner unit 30 detects a predetermined seat belt take-off and wearing pattern and the mode is shifted to the "ID registration (temporary)", the signal indicating the seat belt warning state is not periodically transmitted since the shifting is not caused by malfunctions.

The ID registration trigger transmitted by each seat inner unit 30 can include information of the seat position corresponding to the detected seat belt take-off and wearing pattern. After grasping that there is no unregistered seat inner unit 30, the instrument panel inner unit 10 performs the "main registration" for each seat inner unit 30 in accordance with a reset signal generated by the operation of the reset switch 14 or the like. When the "main registration" is completed, the "registration completion" is notified to the user or the like by the display of the warning light.

For example, when only the seat inner unit 30 of the "2R" seat is replaced after the ID registration is completed for the seat inner units 30 of the "2W" seat and the "2L" seat, it is necessary to perform ID registration for the replaced and newly mounted seat inner unit 30 of the "2R" seat. However, since the ID registration is already completed for the seat inner unit 30 of the "2L" seat, there is no need to register again. Since the instrument panel inner unit 10 grasps the seat positions of the seat inner units 30 whose ID registration are completed and the seat positions of the seat inner units 30 which are newly and temporarily registered, as shown in FIG. 17, after the temporary registration for the seat inner unit 30 of the "2R" seat is completed, the main registration can be immediately performed to complete the operation.

Advantages of In-Vehicle Communication System 100

In the in-vehicle communication system 100 described above, a user operation necessary for the ID registration operation of each seat inner unit 30 can be expressed through using the differences in the seat belt take-off and wearing repetition patterns. Therefore, the ID registration can be performed directly on the vehicle without preparing a special tool dedicated to the vehicle or removing the seat belt device from the vehicle, disassembling the same and taking out internal electronic components thereof. Therefore, for example, when component replacement of the seat belt device is performed, the user himself/herself can perform the ID registration without bringing the vehicle to a dealer. Moreover, since the seating switch SW1 and the buckle switch SW2 are common electronic components required for a function of warning that the user has forgotten to wear the seat belt, it is not necessary to newly add special electronic components.

When the in-vehicle communication system 100 performs the operations shown in FIGS. 14 and 15, since the ID information is registered sequentially in accordance with the predetermined order for the seat inner units 30 at the plurality of seat positions, it is not necessary to individually designate the seat position during the ID registration. Therefore, an operation performed by an operator, such as a user, is a relatively simple repetition of the same operation, so a load of the operation is reduced. For example, when the instrument panel inner unit 10 is replaced, although it is necessary to perform the ID registration again for all of the plurality of seat inner units 30, the operation can be performed efficiently by repeating the same procedure.

When the in-vehicle communication system 100 performs the operation shown in FIG. 17, the seat position can be individually designated through using the differences in the seat belt take-off and wearing repetition patterns. For example, when only one of the plurality of seat inner units 30 is replaced, the ID registration is performed only for the one seat inner unit 30 whose ID information is not registered, and the operation for the registered seat inner units 30 can be omitted, so that efficiency of the entire operation is improved.

Second Embodiment

Next, a second embodiment will be described. In the second embodiment, in addition to the ID registration described in the first embodiment, the in-vehicle communication system 100 uses the buckle switch SW2 to register the seat position of the seat and read the registered seat position. A major difference between the first embodiment and the second embodiment is the configuration of the seat inner unit 30. Since the instrument panel inner unit 10 and the meter unit 20 constituting the in-vehicle communication system 100 are the same as those of the first embodiment described above, a detailed description thereof will be omitted.

Configuration of Seat Inner Unit

Figure 18:
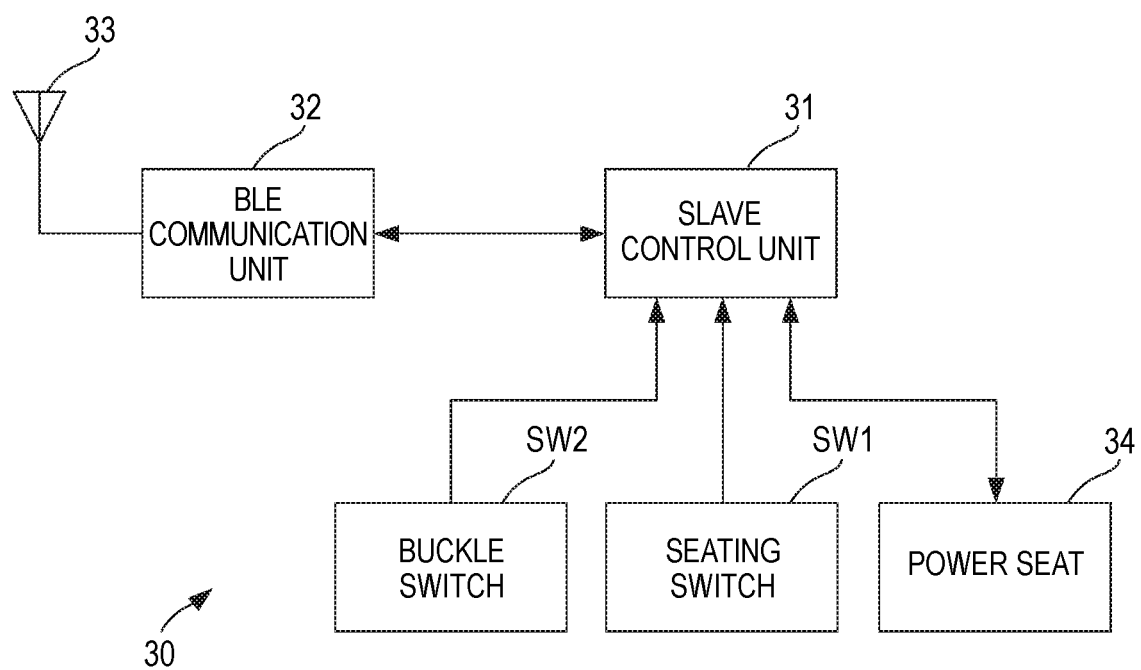
FIG. 18 is a block diagram showing a configuration example of a seat inner unit of a second embodiment.

As shown in FIG. 18, the seat inner unit 30 includes the slave control unit 31, the BLE communication unit 32, the antenna 33, the seating switch SW1, the buckle switch SW2, and a power seat 34. Since the slave control unit 31, the BLE communication unit 32, the antenna 33, the seating switch SW1, and the buckle switch SW2 are the same as those in the first embodiment described above, a detailed description thereof will be omitted. The power seat 34 includes a switch and an electric motor (not shown). By operating the switch, the electric motor slides forward and rearward or adjusts a height of a seat surface, and an inclination of a backrest.

Operation During Seat Position Registration

Figure 19:
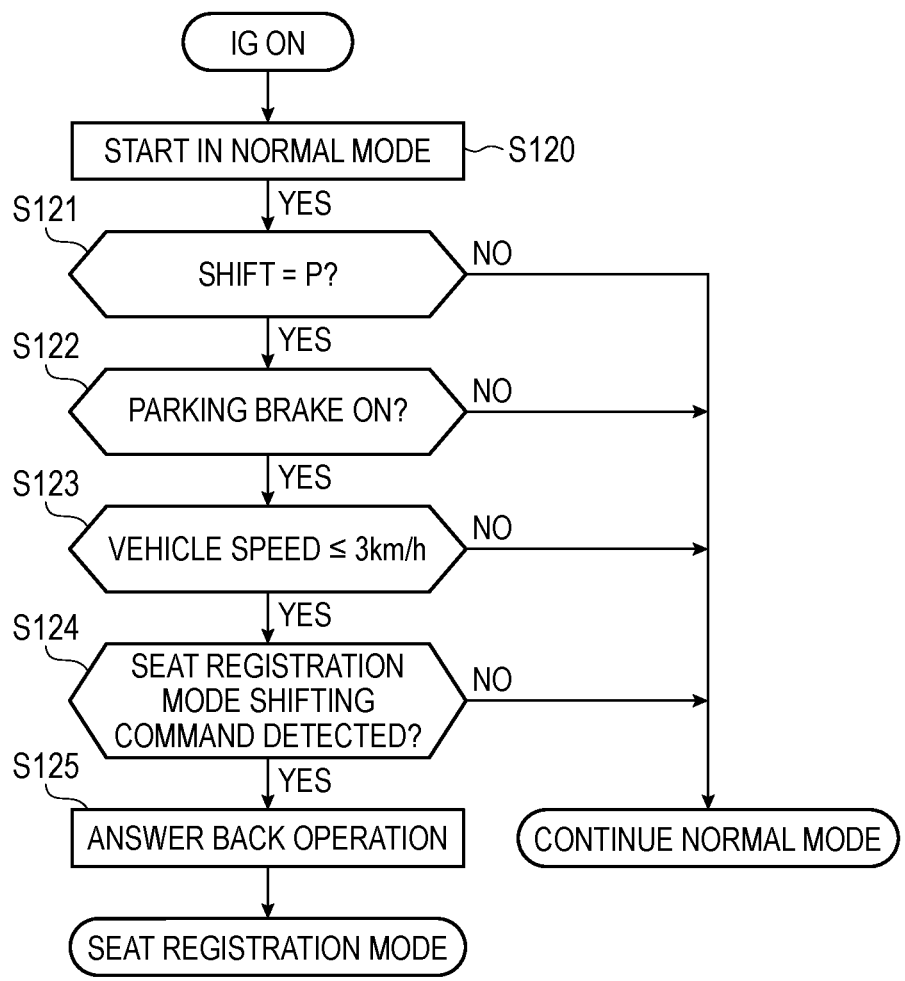
FIG. 19 is a flowchart showing a part of operations of the seat inner unit of the second embodiment.

Next, an operation of the seat inner unit 30 at the time of seat position registration will be described with reference to FIGS. 19 to 20.

When the ignition signal SG-IG is turned on, the signal is detected by the instrument panel inner unit 10, and shift position information, parking brake information, and vehicle speed information are added to IG information which indicates that the IG is on, and are transmitted to the seat inner unit 30. Upon receiving IG on information, the slave control unit 31 of the seat inner unit 30 starts an operation shown in FIG. 19.

Upon receiving the IG information from the instrument panel inner unit 10, the slave control unit 31 starts in the normal mode (S120). Thereafter, the slave control unit 31 proceeds to S124 if a shift is P (parking), a parking brake is on, and a vehicle speed is 3 km/h or less (YES in S121, YES in S122, and YES in S123). On the other hand, in a case where the shift is not P (NO in S121), a case where the parking brake is not on (NC) in S122), and a case where the vehicle speed is faster than 3 km/h (NO in S123), the slave control unit 31 continues the normal mode.

In S124, the slave control unit 31 monitors the buckle switch SW2, and identifies whether a detachment and attachment pattern corresponding to a seat registration mode shifting command is detected. For example, based on a signal indicating on and off of the buckle switch SW2, in a case where a certain number of times a of buckle detachment and attachment are detected within a certain period of time B (for example 5 times of detachment and attachment in 10 seconds) after detection of switching from buckle detachment (buckle switch SW2 on) to buckle attachment (buckle switch SW2 off) for a certain period of time or longer (long detachment and attachment of the buckle), the slave control unit 31 determines that there is a seat registration mode shifting command from a user or the like, and proceeds to S125.

In S125, the slave control unit 31 controls the power seat 34 (electronic device, drive device) to move the seat by a small amount, and then performs an answer back operation of returning to an original position. Due to such an answer back operation, it is possible to recognize that the user or the like has shifted the mode to a seat registration mode.

Figure 20:
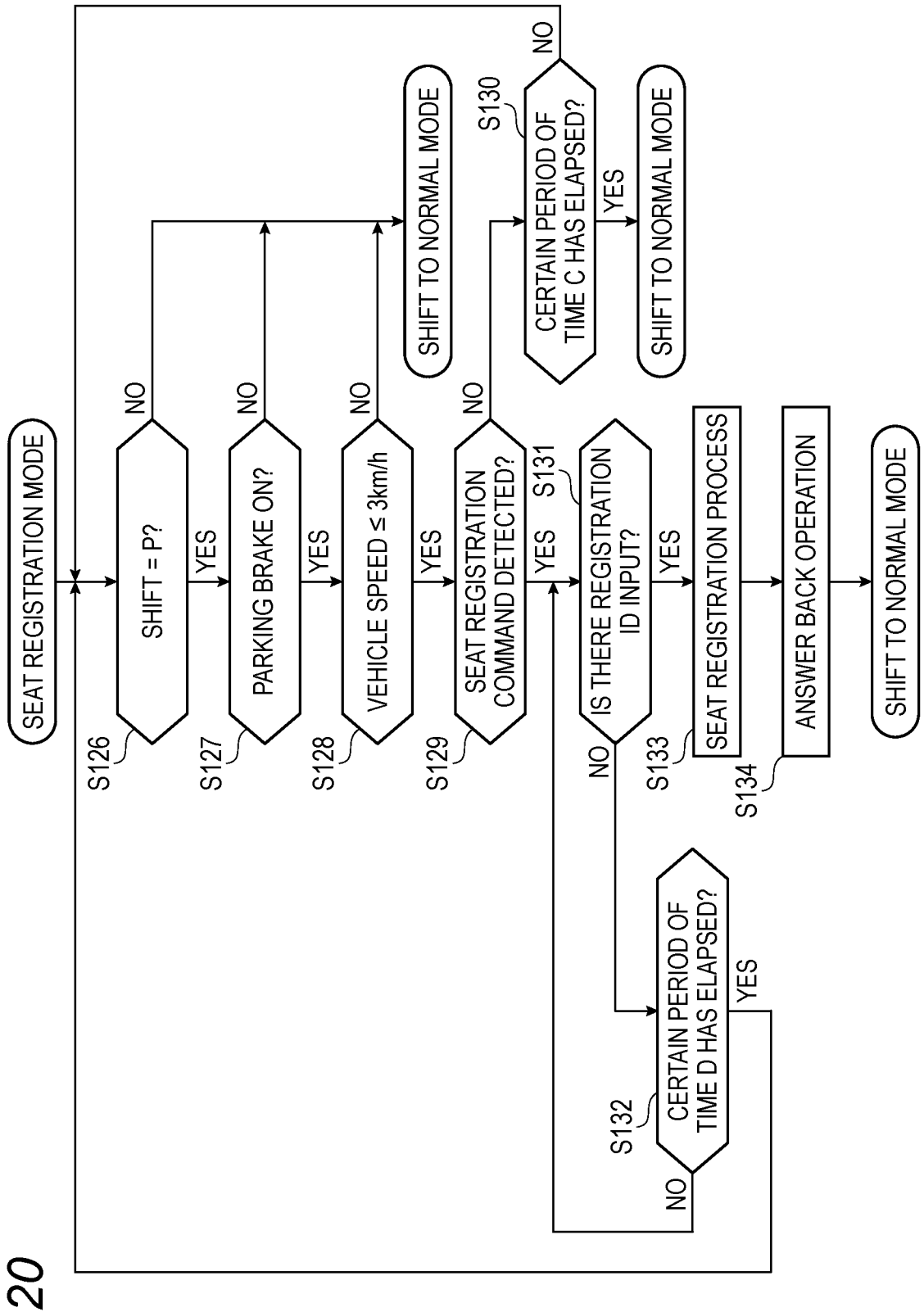
FIG. 20 is a flowchart showing a part of the operations of the seat inner unit of the second embodiment.

In the seat registration mode, as shown in FIG. 20, the slave control unit 31 receives the IG information, the shift position information, the parking brake information and vehicle information from the instrument panel inner unit 10, and determines whether the shift is P, the parking brake is on, and the vehicle speed is 3 km/h or less (S126 to S128). When the shift is P, the parking brake is on and the vehicle speed is 3 km/h or less (YES in S126, YES in S127 and YES in S128), the slave control unit 31 proceeds to S129. On the other hand, in a case where the shift is not P (NO in S126), a case where the parking brake is not on (NC) in S127), and a case where the vehicle speed is faster than 3 km/h (NO in S128), the slave control unit 31 is shifted to the normal mode.

In S129, the slave control unit 31 monitors the buckle switch SW2, and identifies whether a take-off and wearing pattern corresponding to a seat registration command is detected. For example, based on the signal indicating the on and off of the buckle switch SW2, in a case where the long detachment and attachment of the buckle is detected, the slave control unit 31 determines that there is a seat registration command from the user or the like, and proceeds to S131. It should be noted that the user or the like releases the buckle after using the buckle switch SW2 to input the seat registration mode shifting command (S124 of FIG. 19). Then the user or the like operates the power seat 34 while the buckle is released (during detachment of the buckle) to set a desired seat position, and then fastens the buckle. As a result, the slave control unit 31 detects that the long detachment and attachment has been performed (YES in S129 of FIG. 20).

If the long detachment and attachment cannot be detected (NO in S129), the slave control unit 31 proceeds to S130. In S130, the slave control unit 31 determines whether a predetermined period of time C has elapsed since the shifting to the seat registration mode. If the predetermined time period C has not elapsed (NO in S130), the slave control unit 31 returns to S126. If the predetermined time period C has elapsed (YES in S130), the slave control unit 31 is shifted to the normal mode.

In S131, the slave control unit 31 monitors the buckle switch SW2, and identifies whether an registration ID is input by the buckle switch SW2. The user or the like can use the buckle switch SW2 to input any attachment and detachment pattern, thereby registering the input attachment and detachment pattern as the registration ID in the slave control unit 31.

If no attachment and detachment pattern is input through using the buckle switch SW2 (NO in S131), the slave control unit 31 determines whether a predetermined period of time D has elapsed since the seat registration command (long detachment and attachment) is detected (S132). If the predetermined time period D has not elapsed (NO in S132), the slave control unit 31 returns to S131. On the other hand, if the predetermined time period D has elapsed (YES in S132), the slave control unit 31 returns to S126.

On the other hand, when any attachment and detachment pattern is input through using the buckle switch SW2 (YES in S131), the slave control unit 31 performs a seat registration process in which a current seat position is registered and stored in association with the input attachment and detachment pattern (S133). Thereafter, the slave control unit 31 controls the power seat 34 to move the seat by a small amount, then performs an answer back operation of returning to an original position (S134), and then shifts to the normal mode.

Operation During Seat Position Reading

Figure 21:
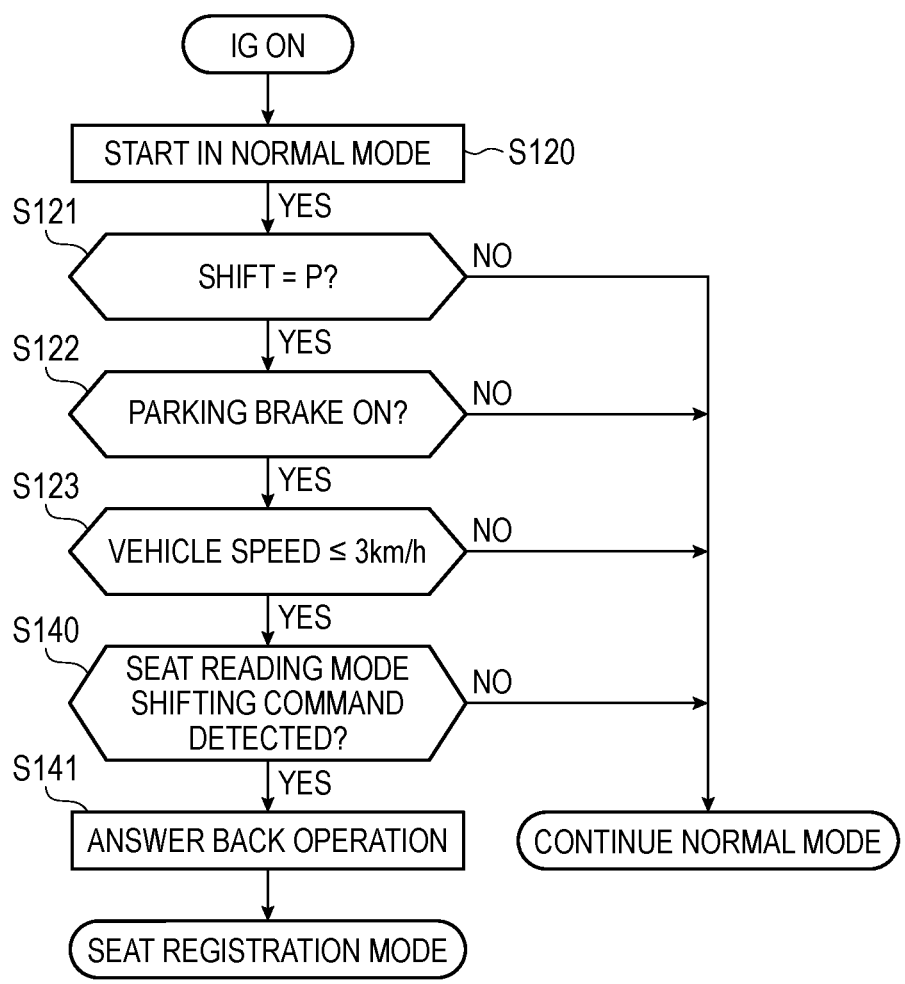
FIG. 21 is a flowchart showing a part of the operations of the seat inner unit of the second embodiment.
Figure 22:
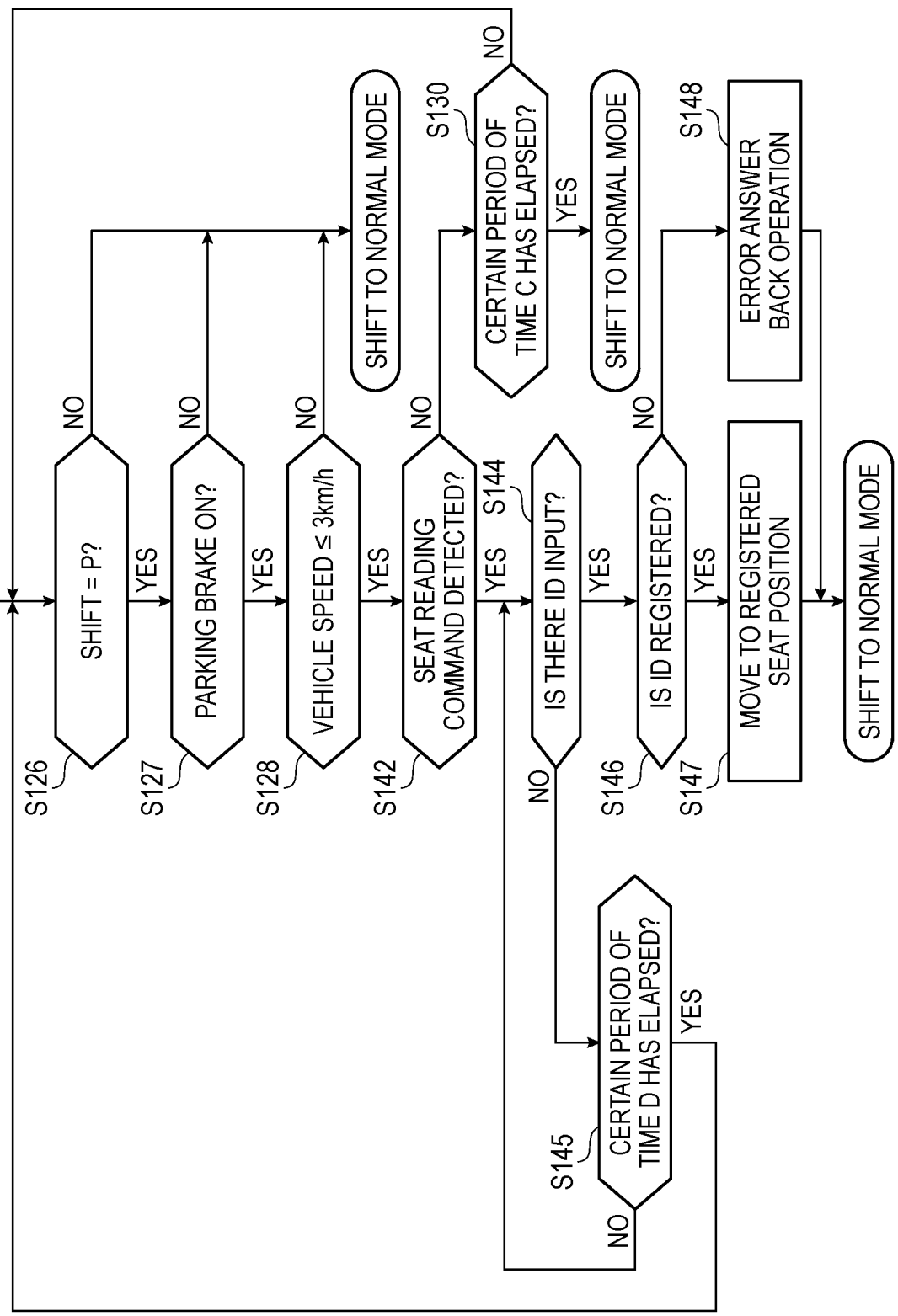
FIG. 22 is a flowchart showing a part of the operations of the seat inner unit of second embodiment.

Next, an operation of the seat inner unit 30 at the time of seat position reading will be described with reference to FIGS. 21 to 22. In FIGS. 21 and 22, parts that are the same as the operation shown in FIGS. 19 and 20, which are already described, are given the same reference numerals, and a detailed description thereof will be omitted.

When the ignition signal SG-IG is turned on, the signal is detected by the instrument panel inner unit 10, and the shift position information, the parking brake information, and the vehicle speed information are added to the IG information which indicates that the IG is on, and are transmitted to the seat inner unit 30. Upon receiving the IG on information, the slave control unit 31 of the seat inner unit 30 starts an operation shown in FIG. 21.

After performing the same operation as S120 to S123 of FIG. 9, the slave control unit 31 proceeds to S140. In S140, the slave control unit 31 monitors the buckle switch SW2, and identifies whether an attachment and detachment pattern corresponding to a seat reading mode shifting command is detected. For example, based on the signal indicating the on and off of the buckle switch SW2, in a case where buckle detachment for more than a predetermined period of time is detected after detection of the long detachment and attachment of the buckle, the slave control unit 31 determines that there is a seat reading anode shifting command from the user or the like, and proceeds to S141.

In S141, the slave control unit 31 controls the power seat 34 to move the seat by a small amount, and then performs the answer back operation of returning to the original position. Due to such an answer back operation, it is possible to recognize that the user or the like has shifted the mode to a seat reading mode.

In the seat reading mode, as shown in FIG. 22, after performing the same operation as S126 to S128 of FIG. 20, the slave control unit 31 proceeds to S142, in S142, the slave control unit 31 monitors the buckle switch SW2, and identifies whether an attachment and detachment pattern corresponding to a seat reading command is detected. For example, in a case where the long detachment and attachment of the buckle is detected, the slave control unit 31 determines that there is a seat reading command from the user or the like, and proceeds to S144. On the other hand, if the slave control unit 31 cannot detect the long detachment and attachment (NO in S142), the process proceeds to S130 (the same as S130 of FIG. 22).

In S144, the slave control unit 31 monitors the buckle switch SW2, and identifies whether an ID (attachment and detachment pattern) is input by the buckle switch SW2. The user or the like uses the buckle switch SW2 to input the attachment and detachment pattern input at the time of registration.

If no ID (attachment and detachment pattern) is input through using the buckle switch SW2 (NO in S144), the slave control unit 31 determines whether the predetermined period of time D has elapsed since the long detachment and attachment is detected (S145). If the predetermined time period D has not elapsed (NO in S145), the slave control unit 31 returns to S126. On the other hand, if the predetermined time period D has elapsed (YES in S145), the slave control unit 31 returns to S144.

On the other hand, if ID is input through using the buckle switch SW2 (YES in S144), the slave control unit 31 determines whether the input ID is registered (S146). If the input ID is registered (YES in S146), the slave control unit 31 controls the power seat 34 to move the seat to the seat position stored in association with the registered ID (S147), and then shifts to the normal mode. If the input ID is not registered (NO in S146), the slave control unit 31 controls the power seat 34 to move by a small amount, then performs an error answer back operation of returning to the original position (S148), and then shifts to the normal mode. Due to such an error answer back operation, the user or the like can recognize that there is an error in the ID input.

State Time Series Change: Operation Example 3

Figure 23:
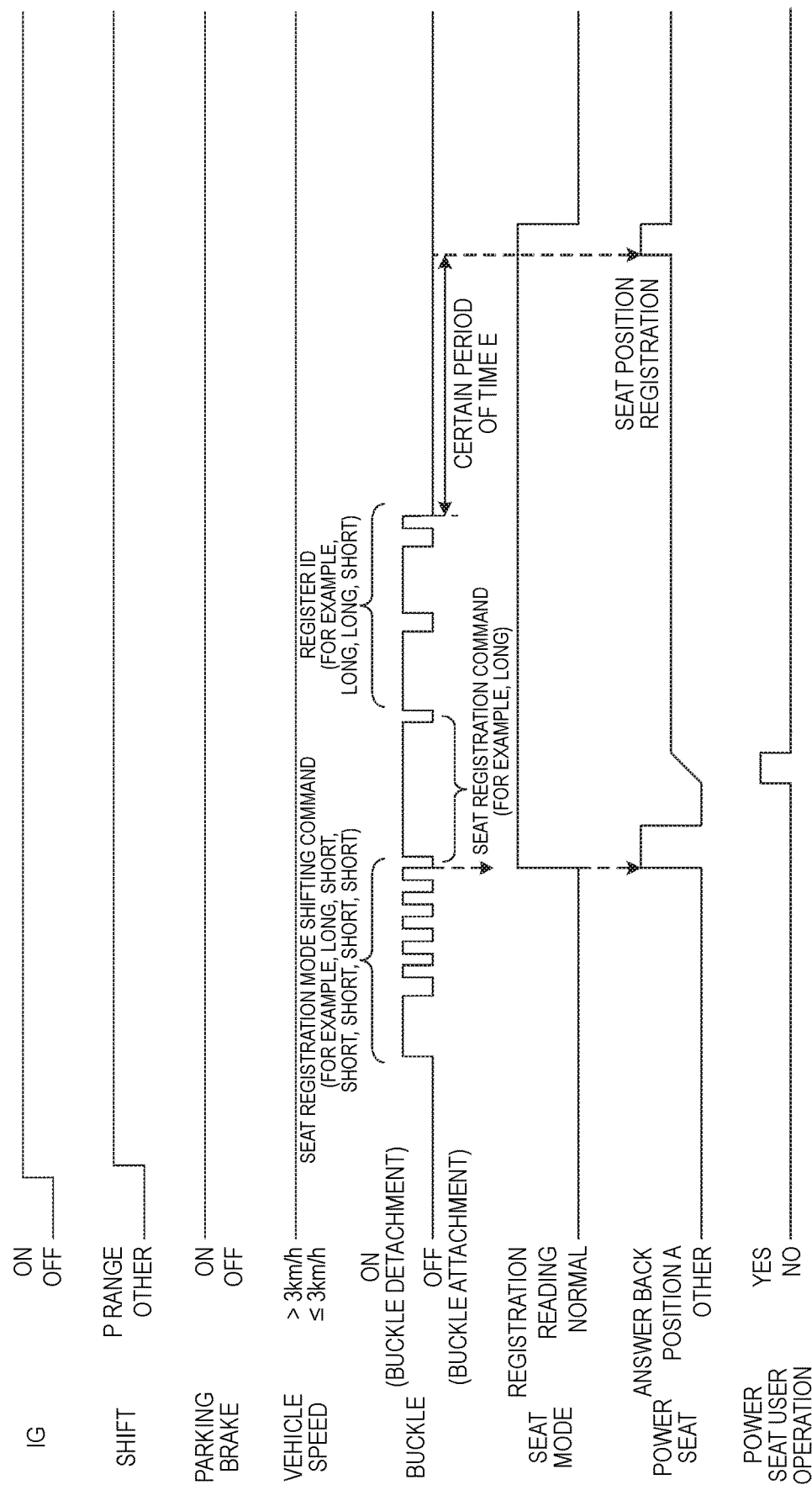
FIG. 23 is a time chart showing time series changes of a state of an operation example 3 of the in-vehicle communication system.
Figure 24:
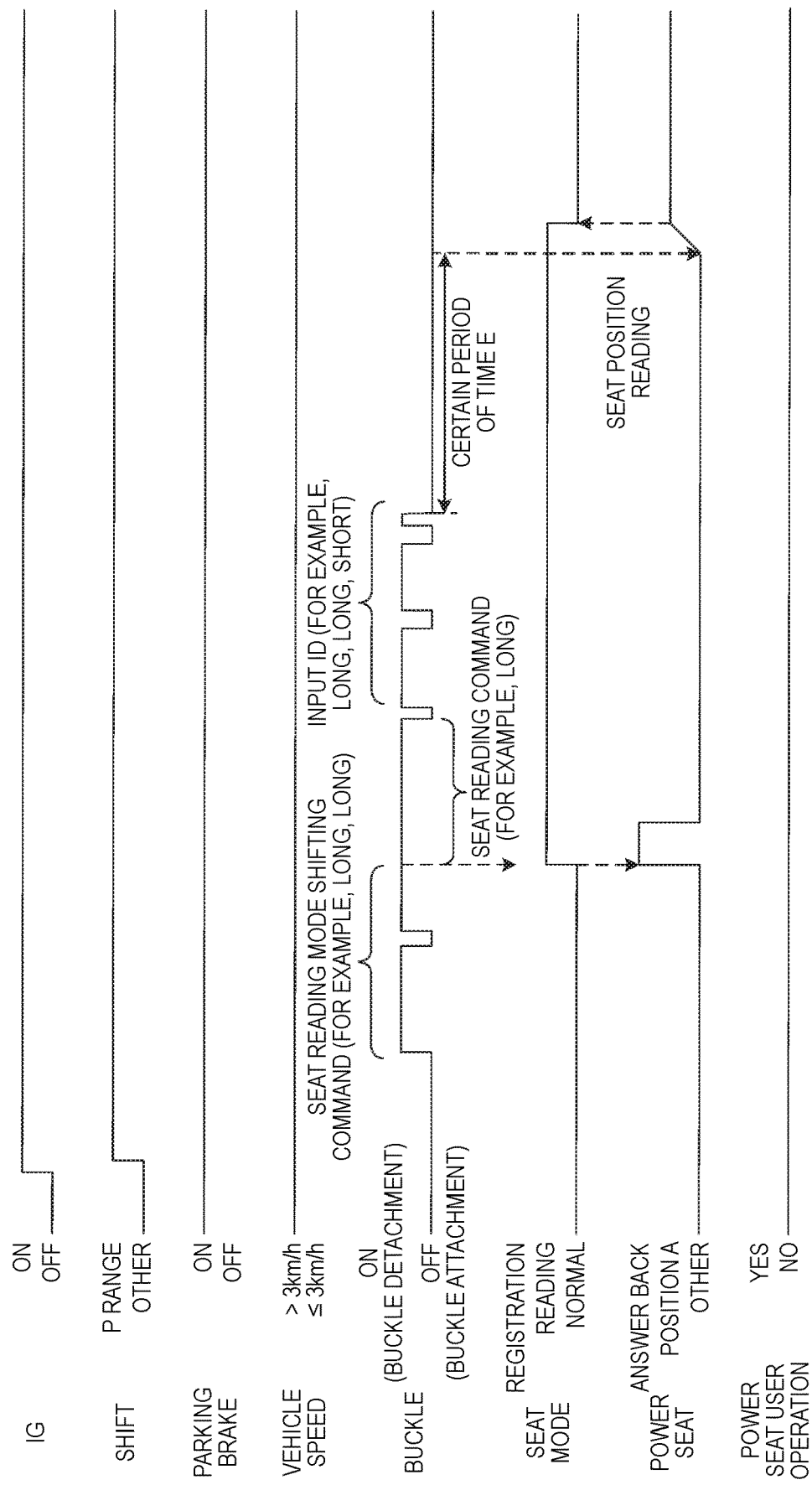
FIG. 24 is a time chart showing time series changes of a state of an operation example 4 of the in-vehicle communication system.

Next, time series changes of a state of an operation example 3 of the in-vehicle communication system 100 are shown in FIGS. 23 and 24. In FIGS. 23 and 24, a horizontal axis represents a common time. First, an operation at the time of seat position registration will be described with reference to FIG. 23. The user turns on an IG switch and sits in a seat whose seat position is to be registered. At this time, the user turns on the IG switch, changes the shift to P and actuates the parking brake. Thereafter, the user wears the seat belt to turn off the buckle switch SW2. Thereafter, the user operates the buckle to input the seat registration mode shifting command. In the present embodiment, for example, the seat registration mode shifting command refers to long detachment and attachment of the buckle followed by a fixed number of times (5 times) of short detachment and attachment of the buckle within the predetermined period of time B.

The slave control unit 31 is shifted from the normal mode to the seat registration mode by the input of such a seat registration mode shifting command. Thereafter, the user releases the buckle and controls the power seat 34 to move the seat to a desired seat position. Next, the user fastens the buckle. As a result, the slave control unit 31 detects the long detachment and attachment of the buckle, determines that the seat registration command has been input, and waits for the user to input a registration ID.

Thereafter, the user inputs any registration ID through using the buckle switch SW2. In the present embodiment, for example, the user inputs a pattern configured by long detachment and attachment of the buckle×2+short detachment and attachment of the buckle×1 as the registration ID, and then fastens the buckle. When the fastening of the buckle continues for a predetermined period of time E or more, the slave control unit 31 identifies the operation pattern operated so far as the registration ID. Then the slave control unit 31 registers the current seat position operated by the user in association with the identified registration ID, performs registration of the recorded seat position, and then shifts to the normal mode.

Next, an operation at the time of seat position reading will be described with reference to FIG. 24. The user turns on the IG switch and sits in the seat. At this time, the user turns on the IG switch, changes the shift to P and actuates the parking brake. Thereafter, the user wears the seat belt to turn off the buckle switch SW2. Thereafter, the user operates the buckle switch SW2 to input the seat reading mode shifting command. In the present embodiment, for example, the seat reading mode shifting command refers to long detachment and attachment of the buckle followed by buckle detachment of a predetermined period of time or more.

The control unit 31 is shifted from the normal mode to the seat reading mode by the input of such a seat reading shifting command. Thereafter, the user fastens the buckle. As a result, the slave control unit 31 detects the long detachment and attachment of the buckle, determines that the seat reading command has been input, and waits for the user to input an ID.

Thereafter, the user inputs the ID registered in advance as described above through using the buckle switch SW2. In the present embodiment, for example, the user inputs the pattern configured by long detachment and attachment of the buckle×2+short detachment and attachment of the buckle×1 as the ID, and then fastens the buckle. When the fastening of the buckle continues for the predetermined period of time E or more, the slave control unit 31 identifies the detachment and attachment pattern operated so far as the ID. If the input ID is registered, the slave control unit 31 reads the seat position registered in association with the input ID, controls the power seat 34 to move the seat to the read seat position, and then shifts to the normal mode.

Advantages of In-Vehicle Communication System 100

In the in-vehicle communication system 100 described above, the seat inner units 30-1 to 30-4 can control the operation of the power seat 34 based on a generation pattern (attachment and detachment pattern) of the signal indicating the on and off of the buckle switch SW2. Therefore, the number of operation units for the power seat 34 is not increased, and cost reduction can thus be achieved.

In the in-vehicle communication system 100 described above, the seat inner units 30-1 to 30-4 can register and read the seat position based on the generation pattern of the signal. Therefore, it is not necessary to provide an operation unit for each registered seat position, and cost reduction can thus be achieved.

In the in-vehicle communication system 100 described above, the seat registration command refers to the long detachment and attachment of the buckle. Therefore, the user can adjust the seat position to the desired position in a state where the seat belt is removed.

According to the in-vehicle communication system 100 described above, the registration and reading of the seat position can be performed only when the shift is changed to P, the parking brake is on and the vehicle speed is 3 km/h or less. As a result, the registration and reading of the seat position cannot be performed while the vehicle is traveling.

Third Embodiment

Next, a third embodiment will be described. In the third embodiment, the in-vehicle communication system 100 controls other devices (air conditioner, speaker, and the like) mounted on the vehicle through using the buckle switch SW2. Although the instrument panel inner unit 10 functions as the master control unit and controls the seat inner unit 30 which is a slave device in the first embodiment, in the third embodiment, the seat inner unit 30 functions as the master control unit, and controls an air conditioner unit 50 and an audio unit 60, which are slave devices to be described below. A major difference between the first embodiment and the third embodiment is the configuration of the in-vehicle communication system 100.

Configuration of In-Vehicle Communication System

Figure 25:
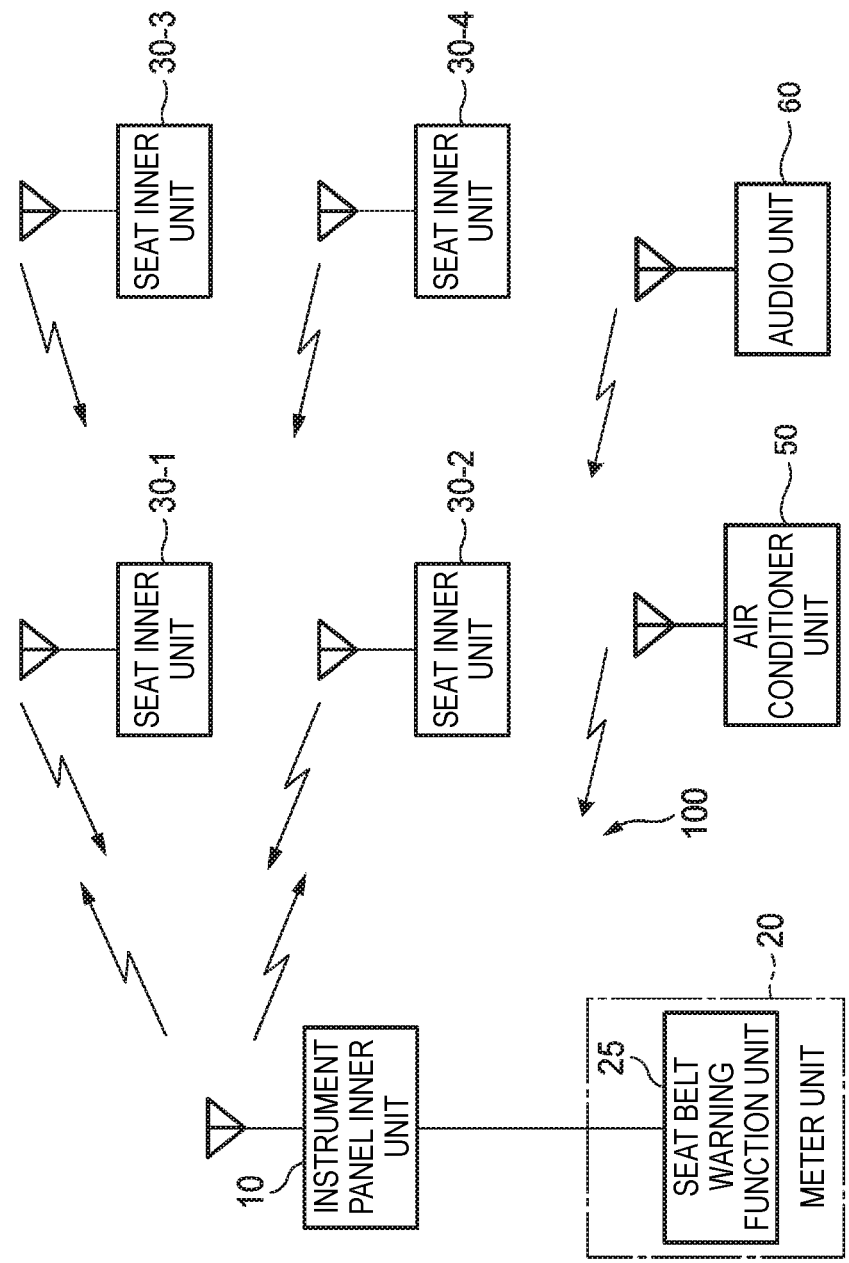
FIG. 25 is a block diagram showing a configuration example of an in-vehicle communication system of a third embodiment.

FIG. 25 is a block diagram showing a configuration example of the in-vehicle communication system 100. The in-vehicle communication system 100 includes one instrument panel inner unit 10, the plurality of seat inner units 30-1 to 30-4, the air conditioner unit 50, and the audio unit 60. Since the instrument panel inner unit 10 and the plurality of seat inner units 30-1 to 30-4 are the same as those of the first embodiment described above, a detailed description thereof will be omitted.

Figure 26:
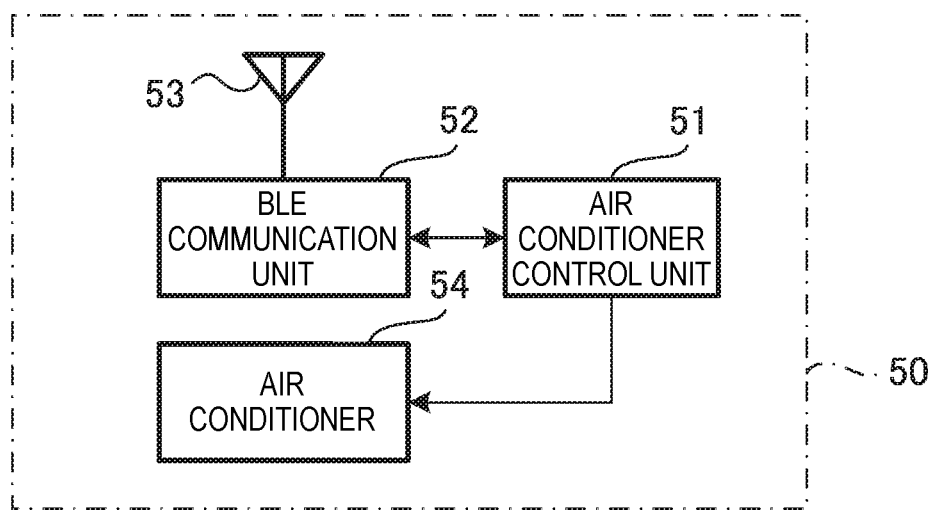
FIG. 26 is a block diagram showing details of an air conditioner unit shown in FIG. 25.
Figure 27:
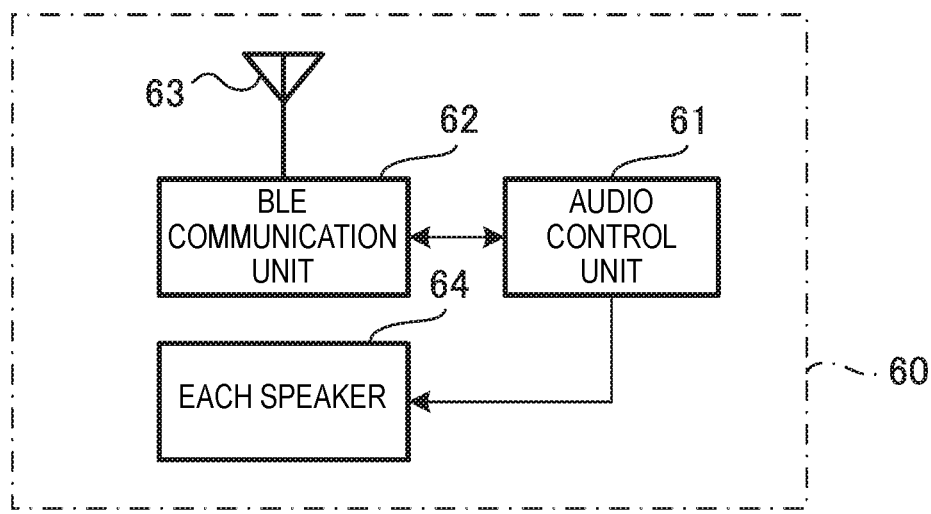
FIG. 27 is a block diagram showing details of an audio unit shown in FIG. 25.

As shown in FIG. 26, the air conditioner unit 50 includes an air conditioner control unit 51, a BLE communication unit 52, an antenna 53, and an air conditioner 54. The air conditioner control unit 51 includes a microcomputer configured to control the air conditioner 54. As shown in FIG. 27, the audio unit 60 includes an audio control unit 61, a BLE communication unit 62, an antenna 63, and each speaker 64. The audio control unit 61 includes a microcomputer configured to control the speaker 64.

Operation During Air Conditioner Control

Next, an outline of an operation of the in-vehicle communication system 100 according to the third embodiment will be described with reference to FIGS. 28 and 29. The user operates the buckle switch SW2 to select a device to be controlled from now. Therefore, in the present embodiment, as shown in FIG. 28, attachment and detachment patterns corresponding one-to-one to devices to be controlled (the air conditioner unit 50 and the audio unit 60) are determined in advance. The slave control unit 31 is shifted to an air conditioner operation mode in which the air conditioner unit 50 is operated in accordance with an attachment and detachment pattern input from the buckle switch SW2, and an audio operation mode for operating the audio unit 60.

When the mode is shifted to the operation mode, the user operates the buckle switch SW2 to operate a selected device. Therefore, in the present embodiment, as shown in FIG. 29, attachment and detachment patterns corresponding one-to-one to operation commands for each of the air conditioner unit 50 and the audio unit 60 are predetermined. After shifting to the air conditioner operation mode, the slave control unit 31 transmits an air conditioner operation request signal indicating operation contents corresponding to an attachment and detachment pattern input from the buckle switch SW2 to the air conditioner unit 50. On the other hand, after shifting to the audio operation mode, the slave control unit 31 transmits an audio operation request signal indicating operation contents corresponding to the attachment and detachment pattern input from the buckle switch SW2 to the audio unit 60.

Next, details of the operation of the in-vehicle communication system 100 briefly described above will be described with reference to FIGS. 30 to 33. In FIGS. 30 to 33, parts that are the same as the operation shown in FIGS. 19 to 22 in the second embodiment above, which are already described, are given the same reference numerals, and a detailed description thereof will be omitted.

When the ignition signal SG-IG is turned on, the signal is detected by the instrument panel inner unit 10, and the shift position information, the parking brake information, and the vehicle speed information are added to the IG information which indicates that the IG is on, and are transmitted to the seat inner unit 30. Upon receiving the IG on information, the slave control unit 31 of the seat inner unit 30 starts an operation shown in FIGS. 30 and 32.

Figure 30:
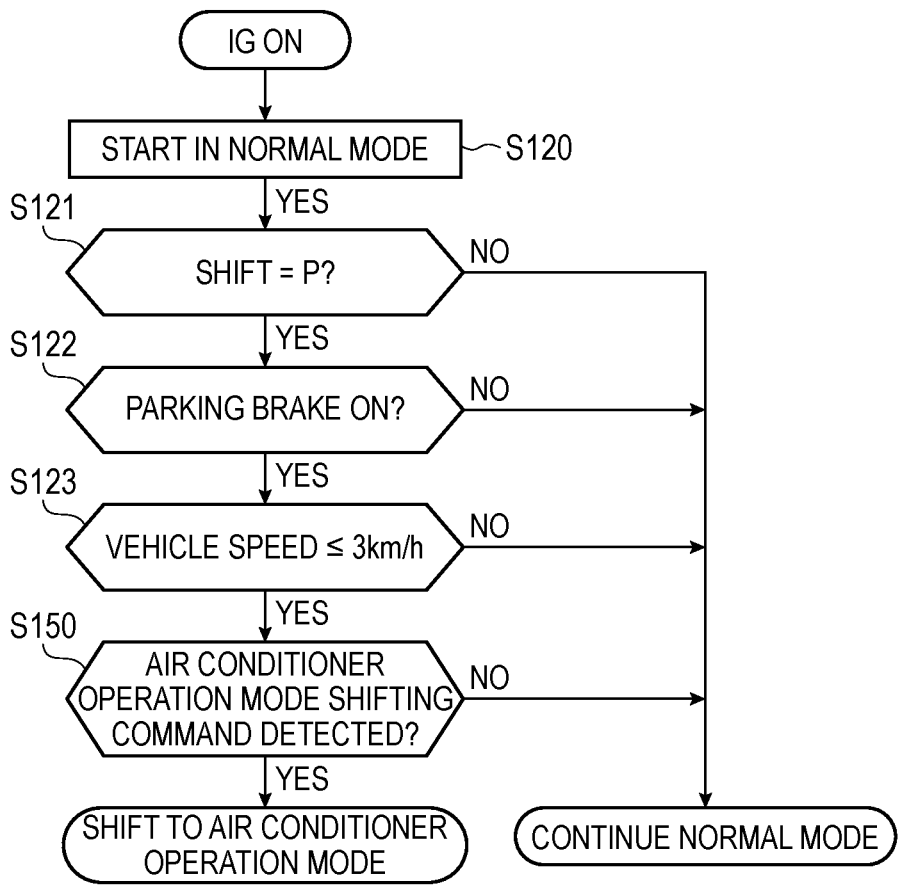
FIG. 30 is a block diagram showing a configuration example of a seat inner unit of the third embodiment.

First, the operation shown in FIG. 30 will be described. After performing the same operation as S120 to S123 of FIG. 19, the slave control unit 31 proceeds to S150. In S150, the slave control unit 31 monitors the buckle switch SW2, and identifies whether an attachment and detachment pattern corresponding to an air conditioner operation mode shifting command is detected. For example, in a case where the predetermined number of times a of on and off of the buckle switch SW2 are detected within the predetermined period of time B (for example 5 times of detachment and attachment in 10 seconds) after detection of the long detachment and attachment of the buckle, the slave control unit 31 determines that there is an air conditioner operation mode shifting command from the user or the like, and selects and shifts to the air conditioner operation mode.

Figure 31:
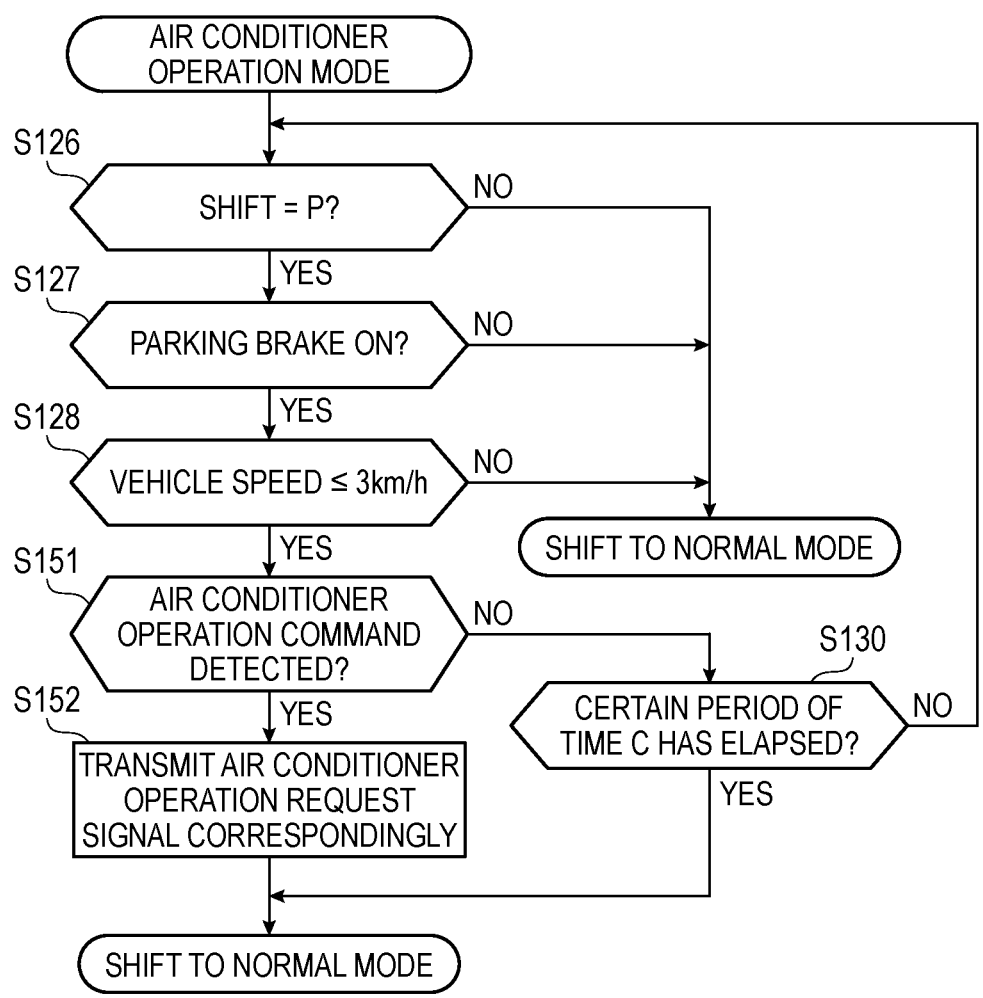
FIG. 31 is a block diagram showing the configuration example of the seat inner unit of the third embodiment.

In the air conditioner operation mode, as shown in FIG. 31, after performing the same operation as S126 to S128 of FIG. 20, the slave control unit 31 proceeds to S152. In S152, the slave control unit 31 monitors the buckle switch SW2, and identifies whether an attachment and detachment pattern corresponding to an air conditioner operation command shown in FIG. 29 is detected. If the air conditioner operation command is not detected (NO in S151), the slave control unit 31 proceeds to S130 (the same as FIG. 20).

On the other hand, when the air conditioner operation command is detected (YES in S151), the slave control unit 31 transmits an air conditioner operation signal corresponding to the air conditioner operation command to the air conditioner unit 50 (S152), and then shifts to the normal mode.

Figure 32:
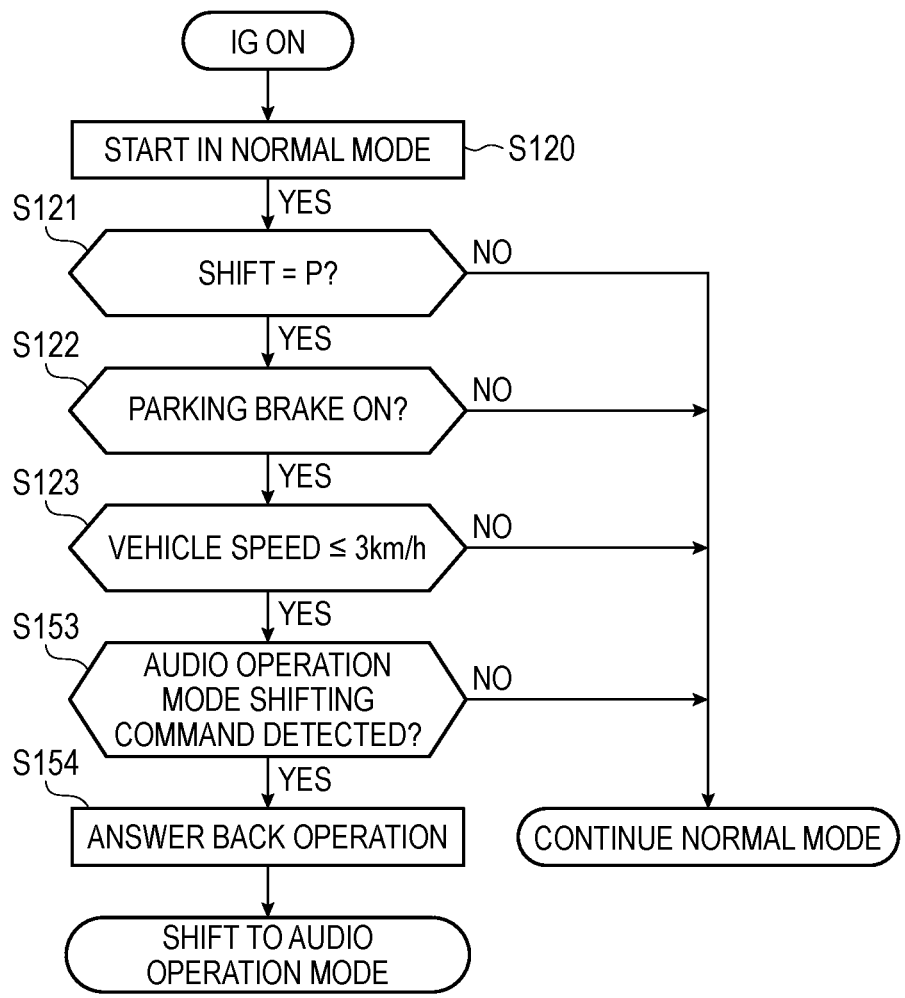
FIG. 32 is a block diagram showing the configuration example of the seat inner unit of the third embodiment.

Next, the operation of FIG. 32 will be described. After performing the same operation as S120 to S123 of FIG. 19, the slave control unit 31 proceeds to S153. In S153, the slave control unit 31 monitors the buckle switch SW2, and identifies whether an attachment and detachment pattern corresponding to an audio operation mode shifting command is detected. For example, in a case where two times of long detachment and attachment are detected, the slave control unit 31 determines that there is an audio operation mode shifting command from the user or the like, and selects and shifts to the audio operation mode.

Figure 33:
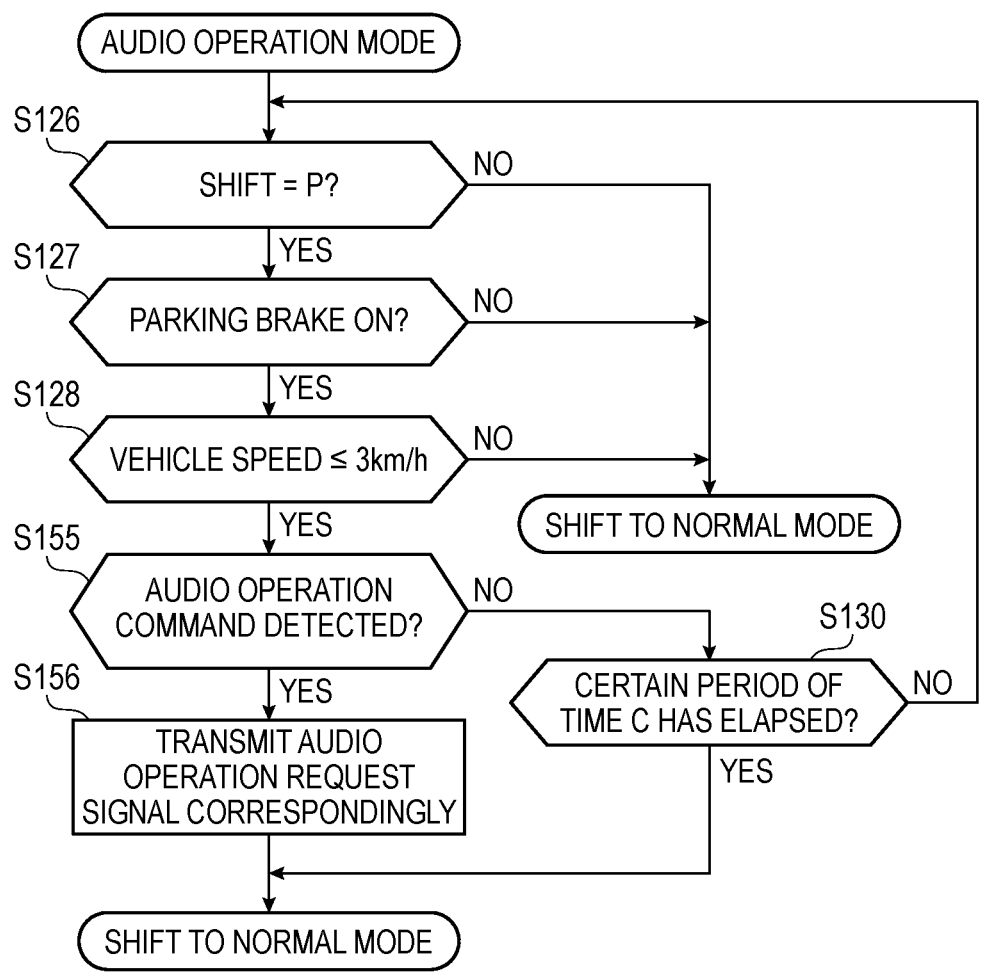
FIG. 33 is a block diagram showing the configuration example of the seat inner unit of the third embodiment.

In the audio operation mode, as shown in FIG. 33, after performing the same operation as S126 to S128 of FIG. 20, the slave control unit 31 proceeds to S155. In S155, the slave control unit 31 monitors the buckle switch SW2, and identifies whether an attachment and detachment pattern corresponding to an audio operation command shown in FIG. 29 is detected. If the audio operation command is not detected (NO in S155), the slave control unit 31 proceeds to S130 (the same as FIG. 20).

On the other hand, when the audio operation command is detected (YES in S155), the slave control unit 31 transmits an audio operation signal corresponding to the audio operation command to the audio unit 60 (S156), and then shifts to the normal mode.

State Time Series Change: Operation Example 5

Figure 34:
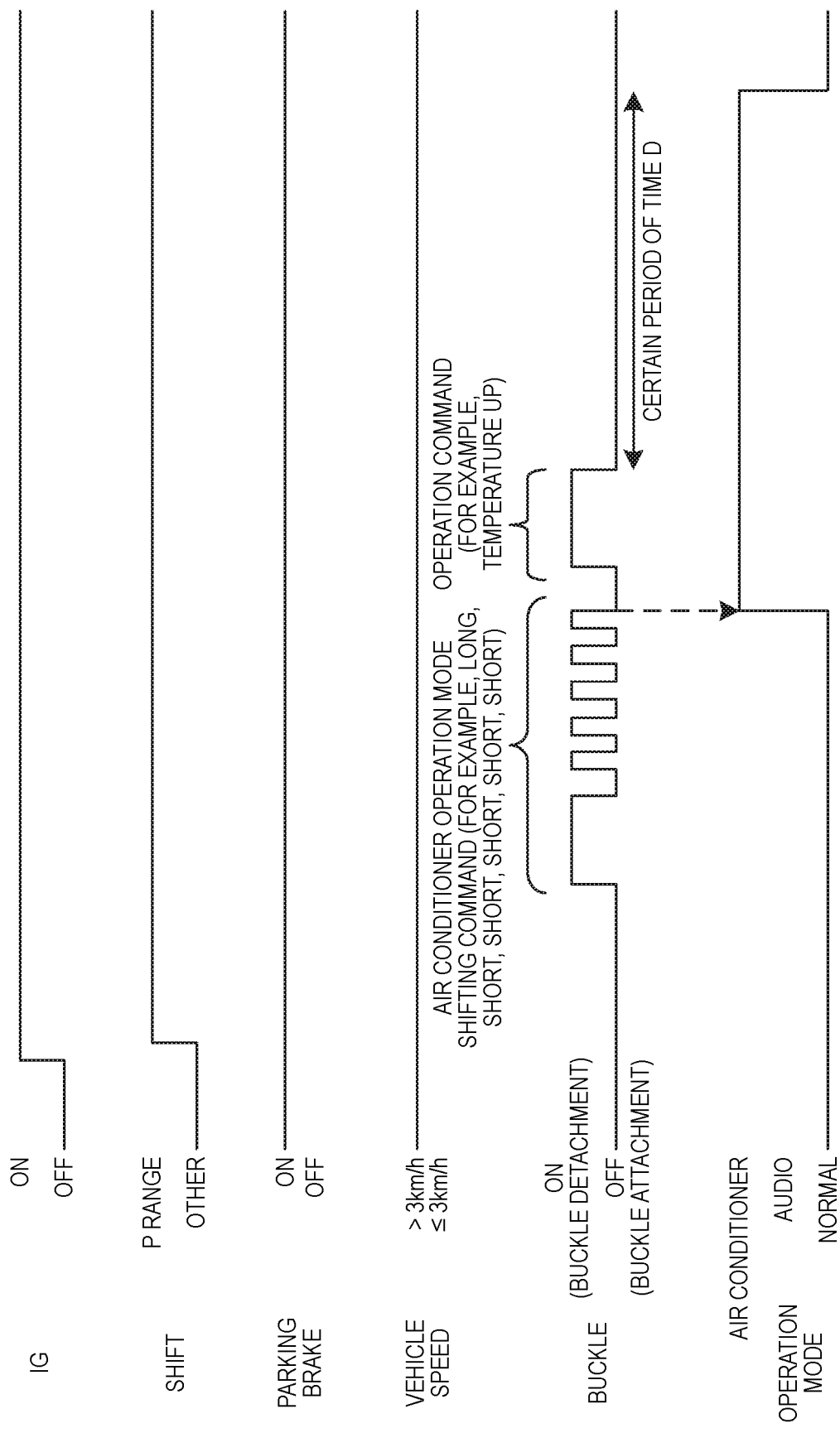
FIG. 34 is a time chart showing time series changes of a state of an operation example 5 of the in-vehicle communication system.
Figure 35:
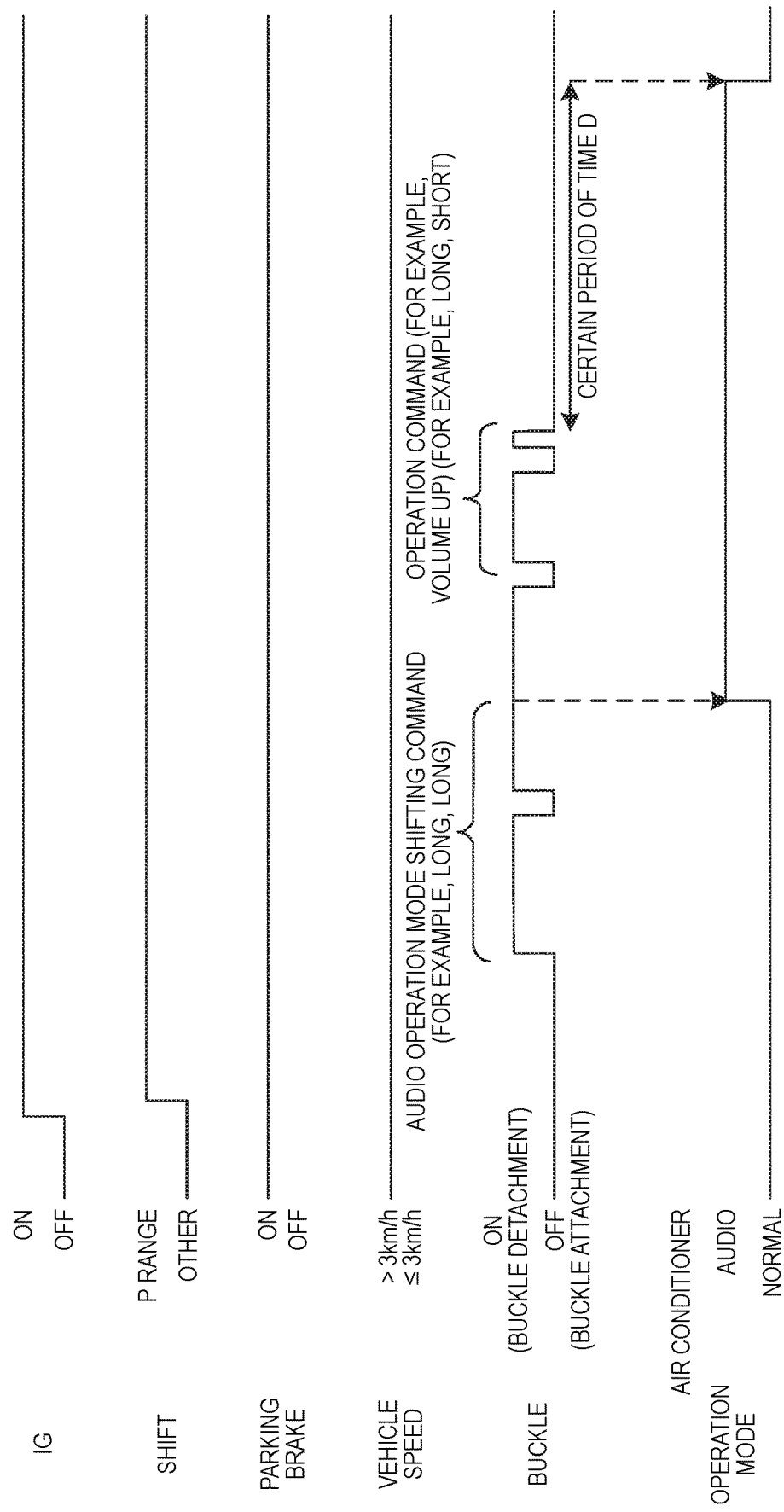
FIG. 35 is a time chart showing time series changes of a state of an operation example 6 of the in-vehicle communication system.

Next, time series changes of a state of an operation example 5 of the in-vehicle communication system 100 are shown in FIGS. 34 and 35. In FIGS. 34 and 35, a horizontal axis represents a common time. First, an operation at the time of an air conditioner operation will be described with reference to FIG. 34. The user turns on the IG switch and sits in the seat. At this time, the user turns on the IG switch, changes the shift to P and actuates the parking brake. Thereafter, the user wears the seat belt to turn off the buckle switch SW2. Thereafter, the user operates the buckle to input the air conditioner operation mode shifting command. In the present embodiment, for example, the air conditioner operation mode shifting command refers to long detachment and attachment of the buckle followed by a fixed number of times (5 times) of short detachment and attachment of the buckle within the predetermined period of time B.

The slave control unit 31 is shifted from the normal mode to the air conditioner operation mode by the input of such an air conditioner operation mode shifting command. Thereafter, the user inputs the operation command to the slave control unit 31 by detaching and attaching the buckle according to a detachment and attachment pattern shown in FIG. 29. In the example shown in FIG. 34, temperature up is input as the operation command. Upon detecting the input of the operation command, the slave control unit 31 transmits an operation request signal corresponding to the operation command to the air conditioner unit 50. Upon receiving the operation request signal from the slave control unit 31, the air conditioner control unit 51 of the air conditioner unit 50 operates the air conditioner 54 in accordance with the received operation request signal.

Next, an operation at the time of an audio operation will be described with reference to FIG. 35. The user turns on the IG switch and sits in the seat. At this time, the user turns on the IG switch, changes the shift to P and actuates the parking brake. Thereafter, the user wears the seat belt to turn off the buckle switch SW2. Thereafter, the user operates the buckle to input the audio operation mode shifting command. In the present embodiment, for example, the audio operation mode shifting command refers to long detachment and attachment of the buckle followed by release of the buckle lasting for a predetermined period of time or more.

The slave control unit 31 is shifted from the normal mode to the audio operation mode by the input of such an audio operation mode shifting command. Thereafter, the user inputs the operation command to the slave control unit 31 by detaching and attaching the buckle according to the detachment and attachment pattern shown in FIG. 29. In the example shown in FIG. 35, volume up is input as the operation command. Upon detecting the input of the operation command, the slave control unit 31 transmits an operation request signal corresponding to the operation command to the audio unit 60. Upon receiving the operation request signal from the slave control unit 31, the audio control unit 61 of the audio unit 60 operates the speaker 64 in accordance with the received operation request signal.

Advantages of In-Vehicle Communication System 100

In the in-vehicle communication system 100 described above, the air conditioner unit 50 and the audio unit 60 can be selected based on a generation pattern of the signal, and the operation request signal can be transmitted to the selected air conditioner unit 50 and the audio unit 60. Therefore, it is not necessary to provide an operation unit for each of the air conditioner unit 50 and the audio unit 60, and cost reduction can thus be achieved.

Although the seat inner unit 30 functions as the master control unit and controls the air conditioner unit 50 and the audio unit 60 which are slave devices according to the third embodiment described above, the invention is not limited thereto. For example, the seat inner unit 30 may transmit the signal indicating the on and off of the buckle switch SW2 to the instrument panel inner unit 10, the instrument panel inner unit 10 functions as the master control unit and controls the air conditioner unit 50 and the audio unit 60 based on the signal indicating the on and off of the buckle switch SW2.

Although the air conditioner unit 50 and the audio unit 60 are controlled according to the third embodiment described above, the slave device to be controlled is not limited thereto, and any electronic device which is mounted on the vehicle and capable of communication may serve as the slave device.

Although BLE communication is performed wirelessly between the units 10, 30, 50, and 60 according to the above-described first to third embodiments, the invention is not limited thereto. The units 10, 30, 50, and 60 may also be wired to perform CAN communication, LIN communication, or the like.

Features of the in-vehicle communication system according to the embodiments of the present invention will be briefly summarized in following [1] to [9].

[1] An in-vehicle communication system includes:

a master control unit (instrument panel inner unit 10, seat inner unit 30) mounted on a vehicle;

a plurality of slave devices (seat inner unit 30, air conditioner unit 50, audio unit 60) mounted on the vehicle; wherein the master control unit is communicably connected to each of the slave device (by using BLE communication units 12, 32, 52, 62)

a plurality of buckles provided in association with each of a plurality of seats mounted on the vehicle; and at least one switch unit (buckle switch SW2) configured to generate a signal in accordance with an attachment and detachment state of at least one of the plurality of buckles, in which the master control unit controls the plurality of slave devices based on the signal generated by the at least one switch unit.

[2] In the in-vehicle communication system according to [1] the at least one switch unit is a plurality of switch units which are configured to generate a signal according to an attachment and detachment state of each of the plurality of buckles, and each one of the plurality of switch units is allocated to each one of the plurality of slave devices respectively.

[3] In the in-vehicle communication system according to [1], the master control unit allocates a unique identification information to each of the plurality of slave devices in response to generation of the signal generated by the at least one switch unit (S15, S16).

[4] In the in-vehicle communication system according to [3], the master control unit repeatedly performs an operation for allocating the unique identification information to each of the plurality of slave devices for a predetermined number of times in a predetermined order in response to the generation of the signal generated by the at least one switch unit (see FIGS. 14 and 15).

[5] In the in-vehicle communication system according to [3], the master control unit recognizes a generation pattern of the signal when allocating the unique identification information to at least one of the plurality of slave devices in response to the generation of the signal generated by the at least one switch unit, and specifies the slave device to be allocated with the unique identification information (see FIG. 17).

[6] In the in-vehicle communication system according to [1], the plurality of slave devices are configured to control an operation of an electronic device (power seat 34), and the operation of the electronic device is controlled based on the signal generated by the at least one switch unit.

[7] In the in-vehicle communication system according to [6], the electronic device is provided in association with each of the plurality of seats, and is a drive device (power seat 34) configured to move the corresponding seat, and the plurality of slave devices are provided in association with the plurality of seats respectively, and each of the plurality of slave devices is configured to control the corresponding drive device based on the signal generated by the at least one switch unit.

[8] In the in-vehicle communication system according to [7], the master control unit switches between a seat position registration mode and a seat position read mode based on the signal generated by the at least one switch unit, registers a current seat position in association with the signal generated by the at least one switch unit after switching to the seat position registration mode, reads the seat position registered in association with the signal generated by the at least one switch unit after switching to the seat position read mode, and controls the drive device to move to the read seat position.

[9] The in-vehicle communication system according to [1], in which the master control unit (seat inner unit 30) selects any one of the plurality of slave devices (air conditioner unit 50, audio unit 60) based on the signal generated by the at least one switch unit, and transmits an operation request signal corresponding to the signal generated by the at least one switch unit to the selected slave device after selecting any one of the plurality of slave devices.

What is claimed is:

1. An in-vehicle communication system comprising:
   a master control unit mounted on a vehicle;
   a plurality of slave devices mounted on the vehicle, wherein the master control unit is communicably connected to each of the slave devices:
   a plurality of buckles provided in association with each of a plurality of seats mounted on the vehicle; and
   at least one switch unit configured to generate a signal in accordance with an attachment and detachment state of at least one of the plurality of buckles,
   wherein the master control unit controls the plurality of slave devices based on the signal generated by the at least one switch unit.

2. The in-vehicle communication system according to claim 1, wherein the at least one switch unit is a plurality of switch units which are configured to generate a signal according to an attachment and detachment state of each of the plurality of buckles; and
   wherein each one of the plurality of switch units is allocated to each one of the plurality of slave devices respectively.

3. The in-vehicle communication system according to claim 1, wherein the master control unit allocates a unique identification information to each of the plurality of slave devices in response to generation of the signal generated by the at least one switch unit.

4. The in-vehicle communication system according to claim 3, wherein the master control unit repeatedly performs an operation for allocating the unique identification information to each of the plurality of slave devices for a predetermined number of times in a predetermined order in response to the generation of the signal generated by the at least one switch unit.

5. The in-vehicle communication system according to claim 3, wherein the master control unit recognizes a generation pattern of the signal when allocating the unique identification information to at least one of the plurality of slave devices in response to the generation of the signal generated by the at least one switch unit, and specifies the slave device to be allocated with the unique identification information.

6. The in-vehicle communication system according to claim 1, wherein the plurality of slave devices are configured to control an operation of an electronic device, and the operation of the electronic device is controlled based on the signal generated by the at least one switch unit.

7. The in-vehicle communication system according to claim 6, wherein the electronic device is provided in association with each of the plurality of seats, and is a drive device configured to move the corresponding seat; and
   wherein the plurality of slave devices are provided in association with the plurality of seats respectively, and each of the plurality of slave devices is configured to control the corresponding drive device based on the signal generated by the at least one switch unit.

8. The in-vehicle communication system according to claim 7, wherein the master control unit switches between a seat position registration mode and a seat position read mode based on the signal generated by the at least one switch unit, registers a current seat position in association with the signal generated by the at least one switch unit after switching to the seat position registration mode, reads the seat position registered in association with the signal generated by the at least one switch unit after switching to the seat position read mode, and controls the drive device to move to the read seat position.

9. The in-vehicle communication system according to claim 1, wherein the master control unit selects any one of the plurality of slave devices based on the signal generated by the at least one switch unit, and transmits an operation request signal corresponding to the signal generated by the at least one switch unit to the selected slave device after selecting any one of the plurality of slave devices.

* * * * *